(12) United States Patent
Fukushima

(10) Patent No.: US 12,651,769 B2
(45) Date of Patent: Jun. 9, 2026

(54) SOLID ELECTROLYTE, METHOD FOR PRODUCING SOLID ELECTROLYTE, AND ENERGY STORAGE DEVICE

(71) Applicant: GS Yuasa International Ltd., Kyoto (JP)

(72) Inventor: Akihiro Fukushima, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 773 days.

(21) Appl. No.: 17/802,329

(22) PCT Filed: Feb. 18, 2021

(86) PCT No.: PCT/JP2021/006105
§ 371 (c)(1),
(2) Date: Aug. 25, 2022

(87) PCT Pub. No.: WO2021/172159
PCT Pub. Date: Sep. 2, 2021

(65) Prior Publication Data
US 2023/0006244 A1 Jan. 5, 2023

(30) Foreign Application Priority Data

Feb. 28, 2020 (JP) ................................. 2020-033317

(51) Int. Cl.
*H01M 10/0562* (2010.01)
*C01B 25/14* (2006.01)
(52) U.S. Cl.
CPC ......... *H01M 10/0562* (2013.01); *C01B 25/14* (2013.01); *C01P 2002/50* (2013.01);
(Continued)

(58) Field of Classification Search
CPC ........... H01M 10/0562; H01M 10/052; H01M 10/0525; H01M 2300/008; H01M 2300/0068; C01B 25/14; C01P 2002/50; C01P 2002/72; C01P 2002/74; Y02E 60/10; H01B 1/06
See application file for complete search history.

(56) References Cited

U.S. PATENT DOCUMENTS

2012/0301796 A1 11/2012 Ohtomo et al.
2014/0141341 A1 5/2014 Ohtomo et al.
(Continued)

FOREIGN PATENT DOCUMENTS

JP 2011-129312 A 6/2011
JP 2013-16423 A 1/2013
(Continued)

OTHER PUBLICATIONS

Kanazawa et al., "Mechanochemical Synthesis and Characterization of Metastable Hexagonal Li4SnS4 Solid Electrolyte", Inorganic Chemistry, 2018, pp. A-F.
(Continued)

*Primary Examiner* — Aiqun Li
(74) *Attorney, Agent, or Firm* — RANKIN, HILL & CLARK LLP

(57) ABSTRACT

One aspect of the present invention is a solid electrolyte containing lithium, phosphorus, sulfur, halogen, and tin as constituent elements and having a crystal structure.

20 Claims, 2 Drawing Sheets

(52) U.S. Cl.
CPC ...... *C01P 2002/72* (2013.01); *C01P 2002/74* (2013.01); *C01P 2006/40* (2013.01); *H01M 2300/008* (2013.01)

(56) References Cited

U.S. PATENT DOCUMENTS

| | | | |
|---|---|---|---|
| 2014/0302382 A1* | 10/2014 | Kambara | H01M 10/0562 |
| | | | 429/321 |
| 2015/0037687 A1 | 2/2015 | Kanno et al. | |
| 2015/0270571 A1 | 9/2015 | Kambara et al. | |
| 2015/0357675 A1 | 12/2015 | Ohtomo et al. | |
| 2017/0005367 A1 | 1/2017 | Berkel et al. | |
| 2017/0222257 A1 | 8/2017 | Miyashita et al. | |
| 2017/0222261 A1 | 8/2017 | Kambara et al. | |
| 2018/0069262 A1 | 3/2018 | Utsuno et al. | |
| 2018/0269521 A1 | 9/2018 | Ohtomo et al. | |
| 2018/0287204 A1 | 10/2018 | Kanno et al. | |
| 2018/0366779 A1 | 12/2018 | Katoh | |
| 2019/0051931 A1 | 2/2019 | Sung et al. | |
| 2020/0067137 A1 | 2/2020 | Berkel et al. | |
| 2020/0112053 A1 | 4/2020 | Mo et al. | |
| 2020/0358132 A1 | 11/2020 | Yamada | |
| 2021/0194050 A1 | 6/2021 | Fukushima et al. | |
| 2021/0218056 A1 | 7/2021 | Fukushima et al. | |
| 2021/0313618 A1 | 10/2021 | To | |
| 2022/0077495 A1 | 3/2022 | Berkel et al. | |

FOREIGN PATENT DOCUMENTS

| | | |
|---|---|---|
| JP | 2013-177288 A | 9/2013 |
| JP | 2014-93261 A | 5/2014 |
| JP | 5873533 B2 | 3/2016 |
| JP | 2017-45613 A | 3/2017 |
| JP | 2017-117635 A | 6/2017 |
| JP | 2017-210393 A | 11/2017 |
| JP | 2018-41671 A | 3/2018 |
| JP | 2018-45997 A | 3/2018 |
| JP | 2018-63759 A | 4/2018 |
| JP | 2018-521173 A | 8/2018 |
| JP | 2018-529205 A | 10/2018 |
| JP | 2018-172244 A | 11/2018 |
| JP | 2018-174130 A | 11/2018 |
| JP | 2019-501105 A | 1/2019 |
| JP | 2019-102263 A | 6/2019 |
| JP | 2019-102355 A | 6/2019 |
| JP | 2019-160510 A | 9/2019 |
| JP | 2019-160625 A | 9/2019 |
| WO | 2018/096957 A1 | 5/2018 |
| WO | 2019/098245 A1 | 5/2019 |
| WO | 2019/239949 A1 | 12/2019 |
| WO | 2020/045633 A1 | 3/2020 |
| WO | 2020/045634 A1 | 3/2020 |

OTHER PUBLICATIONS

Zhang et al., "Li4—xSbxSn1—xS4 solid solutions for air-stable solid electrolytes", Journal of Energy Chemistry, Elsevier, 2020, vol. 41, pp. 171-176.

Park et al., "Solution-Processable Glass LiI—Li4SnS4 Superionic Conductors for All-Solid-State Li-Ion Batteries", Advanced Materials, 2016, vol. 28, pp. 1874-1883.

Zheng et al., "Unraveling (electro)-chemical stability and interfacial reactions of Li10SnP2S12 in all-solid-state Li batteries", Nano Energy, ELSEVIER, 2020, vol. 67, 104252, total 10 pages.

International Search Report (ISR) dated May 11, 2021 filed in PCT/JP2021/006105.

* cited by examiner

SOLID ELECTROLYTE, METHOD FOR PRODUCING SOLID ELECTROLYTE, AND ENERGY STORAGE DEVICE

TECHNICAL FIELD

The present invention relates to a solid electrolyte, a method for producing a solid electrolyte, and an energy storage device.

BACKGROUND ART

A lithium ion secondary battery is widely in use for electronic equipment such as personal computers and communication terminals, automobiles, and the like because the battery has high energy density. The lithium ion secondary battery generally includes a pair of electrodes, which are electrically separated from each other by a separator, and a nonaqueous electrolyte interposed between the electrodes, and is configured to allow lithium ions to be transferred between the two electrodes for charge-discharge. A capacitor such as a lithium ion capacitor is also widely in use as an energy storage device except for the lithium ion secondary battery.

In recent years, as a nonaqueous electrolyte, an energy storage device using a solid electrolyte such as a sulfide solid electrolyte instead of a nonaqueous electrolyte solution in which an electrolyte salt is dissolved in a liquid such as an organic solvent has been proposed. As one of sulfide solid electrolytes, Patent Document 1 describes a sulfide solid electrolyte material which has Li, A (A is at least one of P, Si, Ge, Al, and B), X (X is halogen), and S, is a glass ceramic, and has peaks at $2\theta=20.2°$ and $23.6°$ in X-ray diffraction measurement using a CuKα ray. In addition, Patent Document 2 describes that a sulfide solid electrolyte having a composition of $xLi_2S-25P_2S_5-yLi_3N$ is produced using $Li_2S$, $P_2S_5$, and $Li_3N$ as starting materials.

PRIOR ART DOCUMENTS

Patent Documents

Patent Document 1: JP-2013-016423
Patent Document 2: JP-2018-041671

SUMMARY OF THE INVENTION

Problems to be Solved by the Invention

Since the sulfide solid electrolyte has low water resistance, there is a disadvantage that the sulfide solid electrolyte reacts with water in the atmosphere. For this reason, even when the sulfide solid electrolyte is left in a dry air atmosphere having a small water content, there is a disadvantage that ionic conductivity decreases by reacting with water, and the ionic conductivity is not sufficiently recovered even if the sulfide solid electrolyte is dried thereafter. Here, Patent Document 2 describes that the water resistance of the sulfide solid electrolyte can be improved by the sulfide solid electrolyte containing nitrogen. However, when $Li_3N$ is used as a raw material of such a sulfide solid electrolyte, nitrogen is easily discharged to the outside of the system during heat treatment, and a sufficient water resistance improving effect cannot be obtained.

The present invention has been made based on the above circumstances, and an object of the present invention is to provide a solid electrolyte having high water resistance, a method for producing such a solid electrolyte, and an energy storage device using such a solid electrolyte.

Means for Solving the Problems

One aspect of the present invention made to solve the above problems is a solid electrolyte containing lithium, phosphorus, sulfur, halogen, and tin as constituent elements and having a crystal structure.

Another aspect of the present invention is a method for producing a solid electrolyte, including: preparing a composition containing lithium, phosphorus, sulfur, halogen, and tin; reacting the composition to obtain an intermediate; and heating the intermediate.

Another aspect of the present invention is an energy storage device containing the solid electrolyte according to one aspect of the present invention.

Advantages of the Invention

According to one aspect of the present invention, it is possible to provide a solid electrolyte having high water resistance, a method for producing such a solid electrolyte, and an energy storage device using such a solid electrolyte.

MODE FOR CARRYING OUT THE INVENTION

Figure 1:
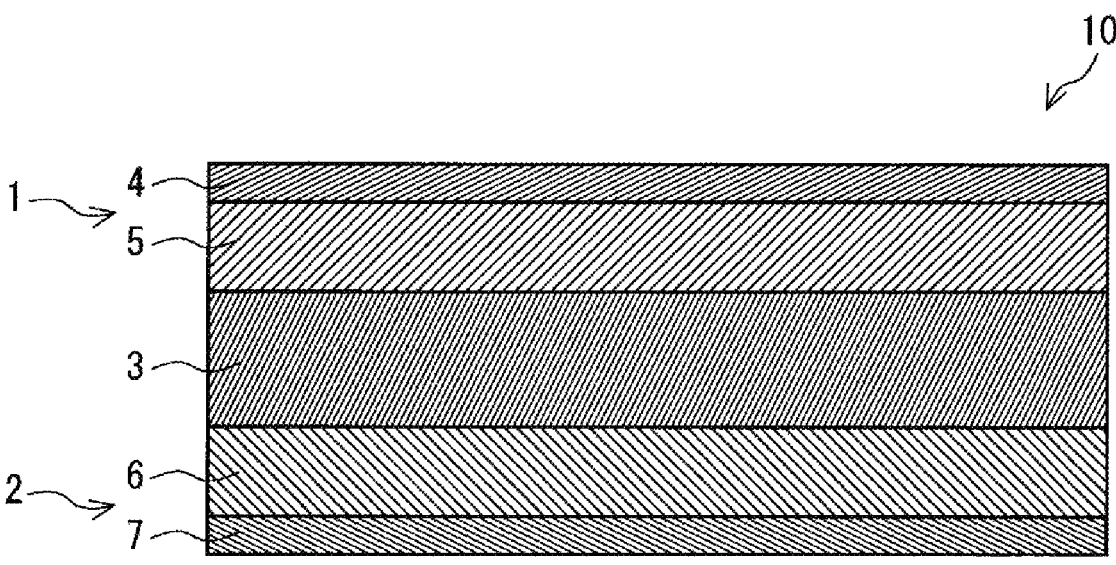
FIG. 1 is a schematic cross-sectional view of an all-solid-state battery as an embodiment of an energy storage device of the present invention.

First, outlines of a solid electrolyte, a method for producing a solid electrolyte, and an energy storage device disclosed in the present specification will be described.

The solid electrolyte according to an embodiment of the present invention is a solid electrolyte containing lithium, phosphorus, sulfur, halogen, and tin as constituent elements and having a crystal structure.

The solid electrolyte has high water resistance. Therefore, according to the solid electrolyte, the ionic conductivity is less likely to decrease when the solid electrolyte is left in a dry air atmosphere or the like, and the recovery rate of the ionic conductivity is also high when the solid electrolyte is dried thereafter. Although the reason why the solid electrolyte exerts such an effect is not clear, the following reason is presumed. The solid electrolyte contains lithium, phosphorus, sulfur, and halogen, and further contains tin as compared with a conventional sulfide solid electrolyte having a crystal structure. According to HSAB (Hard and Soft Acids and Bases) rule, a hard anion ($O^{2-}$) is easily bound to a hard cation ($P^{5+}$). Therefore, in the conventional sulfide solid electrolyte, a reaction between water molecules in the atmosphere and phosphorus in the sulfide solid electrolyte easily occurs. On the other hand, in the solid electrolyte according to an embodiment of the present invention, it is presumed that since tin ($Sn^{4+}$) which is a soft cation is contained, a portion easily bonded to oxygen is reduced, and as a result, water resistance is enhanced.

The crystal structure can be confirmed by powder X-ray diffraction measurement. More specifically, "having a crystal structure" means that a peak derived from the crystal structure of the solid electrolyte is observed in an X-ray diffraction diagram in powder X-ray diffraction measurement. The solid electrolyte may contain an amorphous part. The powder X-ray diffraction measurement is performed by the following procedure. An airtight sample holder for X-ray diffraction measurement is filled with a solid electrolyte powder to be measured in an argon atmosphere having a dew point of −50° C. or lower. Powder X-ray diffraction measurement is performed using an X-ray diffractometer ("MiniFlex II" from Rigaku Corporation). A CuKα ray is used as a radiation source, a tube voltage is 30 kV, and a tube current is 15 mA. The diffracted X-ray passes through a Kβ filter having a thickness of 30 μm and is detected by a high-speed one-dimensional detector (model number: D/teX Ultra 2). A sampling width is 0.01°, a scanning speed is 5°/min, a divergence slit width is 0.625°, a light receiving slit width is 13 mm (OPEN), and a scattering slit width is 8 mm.

The crystal structure of the solid electrolyte preferably has diffraction peaks in a range of 20.2°±0.5° and a range of 23.6°±0.5° in an X-ray diffraction diagram using a CuKα ray. A HICP (High Ion Conduction Phase), which is a high Li ion conductive crystal phase, has diffraction peaks in the range of 20.2°±0.5° and the range of 23.6°±0.5° in the X-ray diffraction diagram using a CuKα ray. Therefore, when such a diffraction peak appears in the solid electrolyte, it can be said that HICP is sufficiently formed, and high ionic conductivity can be exhibited. The "X-ray diffraction diagram using a CuKα ray" is obtained by the powder X-ray diffraction measurement described above.

The crystal structure of the solid electrolyte preferably has a diffraction peak in a range of 25.6°±0.5° in the X-ray diffraction diagram using a CuKα ray. The phase of $Li_{4/3}Sn_{1/3}S_{4/3}$ (LSS) having high water resistance has a diffraction peak in the range of 25.6°±0.5° in the X-ray diffraction diagram using a CuKα ray. Therefore, when such a diffraction peak appears in the solid electrolyte, it can be said that the phase of LSS is sufficiently formed, and the water resistance tends to be further enhanced. In addition, the ionic conductivity of the LSS is higher in a glass ceramic state having a crystal structure than in an amorphous state (glass state). Therefore, in the solid electrolyte, for example, even if the solid electrolyte has the same elemental composition, when the solid electrolyte has a diffraction peak in the range of 25.6°±0.5° in the X-ray diffraction diagram using a CuKα ray, the ionic conductivity tends to be further enhanced.

In the solid electrolyte, the molar ratio of the content of the tin to the content of the phosphorus is preferably 0.05 or more and 1.0 or less. When the content of tin is in the above range, both water resistance and ionic conductivity can be enhanced in a well-balanced manner.

It is preferable that the solid electrolyte further contains nitrogen and an element M as constituent elements, and the element M is at least one selected from the group consisting of aluminum, tantalum, silicon, scandium, magnesium, niobium, boron, hafnium, carbon, zirconium, and titanium.

In the case of such a solid electrolyte, in the production process of the solid electrolyte, discharge of nitrogen, which is an element for enhancing the water resistance described above, to the outside of the system is suppressed, so that the water resistance is further enhanced. Although the reason therefor is not clear, the following reason is presumed. In the method for producing a sulfide solid electrolyte using $Li_3N$ disclosed in Patent Document 2, defect generation energy of nitrogen of $Li_3N$ is small, and nitrogen gas is easily generated. On the other hand, when a raw material compound containing nitrogen and the element M is used, defect generation energy of nitrogen is large, and a nitrogen defect is hardly generated in a synthesis process, so that nitrogen gas is hardly generated. Therefore, it is possible to suppress the discharge of nitrogen to the outside of the system in the production process. The element M is an element having a defect generation energy of nitrogen calculated by first principle calculation described later in a compound represented by AαMβN (A is at least one element selected from the group consisting of lithium, sodium, and potassium, M is the element M, and α and β are numerical values that give a stoichiometric ratio according to the type of the element M) of 4.00 eV or more. The definition of defect generation energy of nitrogen and the like will be described later.

The solid electrolyte preferably contains at least one selected from bromine and iodine as the halogen. When at least one selected from bromine and iodine is contained as the halogen, the ionic conductivity of the solid electrolyte can be further enhanced.

A method for producing a solid electrolyte according to an embodiment of the present invention is a method for producing a solid electrolyte including; preparing a composition containing lithium, phosphorus, sulfur, halogen, and tin; reacting the composition to obtain an intermediate; and heating the intermediate.

According to the production method, a solid electrolyte having high water resistance can be produced.

The "composition" means a mixture obtained by mixing two or more kinds of compounds or simple substances (hereinafter, the compound and the simple substance are also collectively referred to as a compound or the like). It is sufficient if the entire composition, that is, any compound or the like contained in the composition contains lithium, phosphorus, sulfur, halogen, and tin.

The composition preferably contains a compound containing lithium, sulfur, and tin. By preparing or synthesizing such a compound in advance, reacting a composition containing the compound to obtain an intermediate, and heating the intermediate, a solid electrolyte having higher water resistance and ionic conductivity can be produced.

An energy storage device according to an embodiment of the present invention is an energy storage device containing the solid electrolyte. Since the energy storage device uses a solid electrolyte having high water resistance, the reaction of the solid electrolyte with water is suppressed even when the solid electrolyte is placed in the air environment even temporarily during the production process or the like, and good energy storage device performance is exhibited.

Hereinafter, a solid electrolyte, a method for producing a solid electrolyte, and an energy storage device according to an embodiment of the present invention will be sequentially described in detail.

<Solid Electrolyte>

(Composition)

The solid electrolyte according to an embodiment of the present invention contains lithium, phosphorus, sulfur, halogen, and tin as constituent elements. Examples of the halogen include chlorine, bromine, and iodine, and bromine and iodine are preferable. When at least one selected from bromine and iodine is contained as the halogen, the ionic conductivity of the solid electrolyte can be further enhanced. One kind or two or more kinds of halogens may be contained.

In an embodiment of the present invention, the molar ratio of the content of tin to the content of phosphorus (Sn/P) may be, for example, 0.01 or more and 2 or less, but is preferably 0.05 or more and 1.0 or less, more preferably 0.1 or more and 0.6 or less, and may be further preferably 0.4 or less, 0.2 or less, or 0.15 or less. By setting the content ratio (Sn/P) to be equal to or greater than the lower limit, a sufficient amount of tin can be contained in the solid electrolyte, and the water resistance is further improved. On the other hand, by setting the content ratio (Sn/P) to be equal to or less than the upper limit, the ionic conductivity tends to be enhanced.

The molar ratio of the content of lithium to the content of phosphorus (Li/P) is preferably 3 or more and 10 or less, more preferably 3.4 or more and 8 or less, still more preferably 3.8 or more and 6 or less, and may be even more preferably 5 or less or 4.5 or less. By setting the content ratio (Li/P) within the above range, the composition of the solid electrolyte is further optimized, and the water resistance, ionic conductivity, and the like are further enhanced.

The molar ratio of the content of sulfur to the content of phosphorus (S/P) is preferably 2 or more and 10 or less, more preferably 3 or more and 8 or less, still more preferably 3.5 or more and 6 or less, and may be even more preferably 5 or less. By setting the content ratio (S/P) within the above range, the composition of the solid electrolyte is further optimized, and the water resistance, ionic conductivity, and the like are further enhanced.

The molar ratio of the content of halogen (X) to the content of phosphorus (X/P) is preferably 0.1 or more and 1 or less, more preferably 0.2 or more and 0.8 or less, and still more preferably 0.3 or more and 0.6 or less. By setting the content ratio (X/P) to be equal to or greater than the lower limit or more, HICP is easily precipitated, and the ionic conductivity may be enhanced. On the other hand, by setting the content ratio (X/P) to be equal to or less than the upper limit, the crystal phase of lithium halide is less likely to remain, and the ionic conductivity may be enhanced.

It is preferable that the solid electrolyte further contains nitrogen and an element M as constituent elements, and the element M is at least one selected from the group consisting of aluminum, tantalum, silicon, scandium, magnesium, niobium, boron, hafnium, carbon, zirconium, and titanium. Among the elements M, at least one selected from the group consisting of aluminum, tantalum, silicon, scandium, magnesium, niobium, and boron is more preferable. When the solid electrolyte further contains such an element, the water resistance is further enhanced.

The molar ratio of the content of nitrogen (N) to the content of phosphorus (N/P) is preferably 0.01 or more and 1.2 or less, more preferably 0.1 or more and 1.0 or less, and still more preferably 0.2 or more and 0.6 or less. By setting the content ratio (N/P) to be equal to or greater than the lower limit or more, the water resistance can be further enhanced. On the other hand, by setting the content ratio (N/P) to be equal to or less than the upper limit, the ionic conductivity and the like are enhanced.

The molar ratio of the content of the element M to the content of phosphorus (M/P) is preferably 0.01 or more and 1 or less, more preferably 0.05 or more and 0.6 or less, and still more preferably 0.1 or more and 0.4 or less. By setting the content ratio (M/P) to be equal to or greater than the lower limit, the discharge of nitrogen to the outside of the system is more sufficiently suppressed, and the water resistance can be further enhanced. On the other hand, by setting the content ratio (M/P) to be equal to or less than the upper limit, the ionic conductivity and the like are further enhanced.

The molar ratio of the content of the element M to the content of nitrogen (M/N) is preferably 0.1 or more and 2 or less, and more preferably 0.3 or more and 1 or less. By setting the content ratio (M/N) within the above range, the water resistance, ionic conductivity, and the like can be further enhanced.

The solid electrolyte may further contain elements other than lithium, phosphorus, sulfur, halogen, tin, nitrogen, and the element M. However, the molar ratio of the content of the other elements to the content of phosphorus in the solid electrolyte may be preferably, for example, less than 0.1, and more preferably less than 0.01, and the solid electrolyte may not substantially contain the other element.

In an embodiment of the present invention, the solid electrolyte may be represented by the following formula 1.

$$(100-d)((1-c)((1-b)(a\mathrm{Li_2S}\cdot(1-a)\mathrm{P_2S_5})\cdot b\mathrm{Li}_\alpha \mathrm{M}_\beta\mathrm{N})\cdot c\mathrm{LiX})\cdot d\mathrm{Li_{4/3}Sn_{1/3}S_{4/3}}\cdot e\mathrm{Y} \qquad 1$$

In the above formula 1, X is halogen. M is the element M. Y is one or more elements other than Li, P, S, X (halogen), N, and M (element M). a is a number of 0.5 or more and 0.8 or less. b is a number greater than 0 and 0.5 or less. c is a number of 0.04 or more and 0.4 or less. d is a number greater than 0 and 60 or more. e is a number of 0 or more and 25 or less.

The above formula 1 represents the content ratio of elements Li, P, S, N, M, X, and Y in the solid electrolyte (composition formula), and does not specify a compound as a raw material.

Specific examples and preferable examples of X (halogen), M (element M), and the like are as described above. Each of X and M may be two or more elements.

The a is preferably 0.6 or more and 0.78 or less, and more preferably 0.67 or more and 0.76 or less. The b is preferably 0.05 or more and 0.4 or less, and more preferably 0.1 or more and 0.3 or less. The c is preferably 0.1 or more and 0.35 or less. The d is preferably 1 or more and 50 or less, more preferably 5 or more and 40 or less, and may be further preferably 30 or less or 20 or less. The e may be 0 or more and 5 or less, 0 or more and 1 or less, or 0.

When the solid electrolyte has such a composition, the water resistance, ionic conductivity, and the like are further improved.

(Crystal Structure)

The solid electrolyte has a crystal structure. Examples of the crystal structure of the solid electrolyte include HICP, LGPS type, argyrodite type, $\mathrm{Li_{4/3}Sn_{1/3}S_{4/3}}$(LSS), $\mathrm{Li_7P_3S_{11}}$, ß-$\mathrm{Li_3PS_4}$, and Thio-LISICON type. Among these, the solid electrolyte preferably contains HICP as a crystal structure from the point that high ionic conductivity can be exhibited. More specifically, the solid electrolyte preferably has diffraction peaks at a diffraction angle 2θ derived from HICP in a range of 20.2°±0.5° and a range of 23.6°±0.5° in an X-ray diffraction diagram using a CuKα ray.

The solid electrolyte preferably contains a phase of $\mathrm{Li_{4/3}Sn_{1/3}S_{4/3}}$(LSS) as a crystal structure from the point that the water resistance and ionic conductivity are further enhanced. More specifically, the solid electrolyte preferably has a diffraction peak at a diffraction angle 2θ derived from a phase of LSS in a range of 25.6°±0.5° in an X-ray diffraction diagram using a CuKα ray.

(Physical Properties, Applications, and the Like)

The lower limit of the ionic conductivity of the solid electrolyte at 25° C. is preferably 0.2 mS/cm, more preferably 0.5 mS/cm, still more preferably 1 mS/cm, and even more preferably 2 mS/cm. When the ionic conductivity of the solid electrolyte at 25° C. is equal to or greater than the lower limit, the charge-discharge performance of the energy storage device can be enhanced. The upper limit of the ionic conductivity is, for example, 50 mS/cm and may be 25 mS/cm.

The ionic conductivity of the solid electrolyte is determined by measuring an alternating-current impedance by the following method. Under an argon atmosphere having a dew point of −50° C. or lower, 120 mg of the sample powder is put into a powder molder of 10 mm in inner diameter, and then subjected to uniaxial pressing at 50 MPa or less with the use of a hydraulic press. After pressure release, 120 mg of SUS316L powder as a current collector is put on an upper surface of the sample, and then subjected to uniaxial pressing at 50 MPa or less with the use of the hydraulic press again. Next, 120 mg of SUS316L powder as a current collector is put on a lower surface of the sample, and then subjected to uniaxial pressing at 360 MPa for 5 minutes to obtain a pellet for ionic conductivity measurement. This pellet for ionic conductivity measurement is inserted into an HS cell from Hohsen Corp. to measure the alternating-current impedance at a predetermined temperature. The measurement conditions are an applied voltage amplitude of 20 mV, a frequency range of 1 MHz to 100 mHz, and a measurement temperature of 25° C.

The shape of the solid electrolyte is not particularly limited, and is usually granular, massive, or the like. The solid electrolyte can be suitably used as an electrolyte of an energy storage device such as a lithium ion secondary battery, particularly a lithium ion energy storage device. Among them, the solid electrolyte can be particularly suitably used as an electrolyte of an all-solid-state battery. The solid electrolyte can be used for any of a positive electrode layer, an isolation layer, a negative electrode layer and the like in the energy storage device.

<Method of Producing Solid Electrolyte>

The method for producing a solid electrolyte according to an embodiment of the present invention is not particularly limited, but the following method is preferable. More specifically, a method for producing a solid electrolyte according to an embodiment of the present invention includes: preparing a composition containing lithium, phosphorus, sulfur, halogen, and tin (preparation step); reacting the composition to obtain an intermediate (reaction step); and heating the intermediate (heating step).

(Preparation Step)

In this step, a composition containing lithium, phosphorus, sulfur, halogen, and tin is prepared. The composition is usually a mixture of two or more compounds containing at least one element of lithium, phosphorus, sulfur, halogen, and tin. It is sufficient if the elements lithium, phosphorus, sulfur, halogen, and tin are contained in the composition (mixture). Two or more elements of lithium, phosphorus, sulfur, halogen, and tin may be contained in one compound. The composition may contain a compound or the like that does not contain any element of lithium, phosphorus, sulfur, halogen, and tin.

Examples of the compound or the like containing lithium include $Li_2S$, $Li_2O$, $Li_3N$, $Li_2CO_3$, LiX (X is halogen), and metallic lithium. In addition, a Li—Sn—S-containing compound, a Li-M-N-containing compound, and the like described later are also compounds containing lithium. Among these, $Li_2S$ is preferable. The compound or the like containing lithium may be used singly, or two or more thereof may be used in mixture.

Examples of the compound or the like containing phosphorus include $P_2S_3$, $P_2S_5$, $P_2O_5$, $P_3N_5$, and elemental phosphorus. Among these, $P_2S_3$ and $P_2S_5$ are preferable, and $P_2S_5$ is more preferable. The compound or the like containing phosphorus may be used singly, or two or more thereof may be used in mixture.

Examples of the compound or the like containing sulfur include $Li_2S$, $P_2S_3$, $P_2S_5$, $Al_2S_3$, $SiS_2$, $SnS_2$, $Li_{4/3}Sn_{1/3}S_{4/3}$, and elemental sulfur. Among these, $Li_2S$, $P_2S_3$, $P_2S_5$, $SnS_2$ and $Li_{4/3}Sn_{1/3}S_{4/3}$ are preferable. The compound or the like containing sulfur may be used singly, or two or more thereof may be used in mixture.

Examples of the compound or the like containing halogen include metal halides such as LiX (X is halogen, and is specifically LiCl, LiBr, LiI, or the like), $MgCl_2$, $MgBr_2$, $MgI_2$, $CaCl_2$, $CaBr_2$, $CaI_2$, and tin halides ($SnCl_2$, $SnI_2$, and the like). Among these, LiX is preferable, and LiBr and LiI are more preferable. The compound or the like containing halogen may be used singly, or two or more thereof may be used in mixture.

Examples of the compound or the like containing tin include SnS, $SnS_2$, $SnO_2$, tin halides ($SnCl_2$, $SnI_2$, and the like), $Li_{4/3}Sn_{1/3}S_{4/3}$, and elemental tin. The compound or the like containing tin may be used singly, or two or more thereof may be used in mixture.

(Li—Sn—S-Containing compound)

Among the compounds containing tin, a compound containing lithium, tin, and sulfur (hereinafter, it is also described as a Li—Sn—S-containing compound.) such as $Li_{4/3}Sn_{1/3}S_{4/3}$ can be suitably used. By subjecting a composition containing a Li—Sn—S-containing compound to a reaction step and a heating step, a solid electrolyte having higher water resistance and ionic conductivity can be produced. The Li—Sn—S-containing compound to be used may have a crystal structure or may be glassy.

The Li—Sn—S-containing compound can be produced, for example, by preparing a compound containing lithium, a compound containing tin, and a compound containing sulfur, mixing them in a mortar or the like, and subjecting them to a mechanical milling treatment. As the raw material compound, a compound containing two elements of lithium, tin, and sulfur can be used. For example, $Li_{4/3}Sn_{1/3}S_{4/3}$ can be obtained by performing a mechanical milling treatment using $Li_2S$ and $SnS_2$. By a performing mechanical milling treatment, a glassy Li—Sn—S-containing compound is efficiently obtained. Incidentally, the Li—Sn—S-containing compound may be synthesized by a method other than the mechanical milling treatment.

The mechanical milling may be either dry or wet. Examples of the mechanical milling include case-driven mills, medium stirring mills, milling with a high-speed rotary crusher, roller mills, and jet mills. Examples of the case-driven mill include rotary mills, vibration mills, and planetary mills. Examples of the medium stirring mill include attritors and bead mills. Examples of the milling with a high-speed rotary crusher include hammer mills and pin mills. Among these, the case-driven mills are preferable, and the planetary mills are particularly preferable.

(Li-M-N-Containing Compound)

The composition preferably further contains nitrogen and an element M, more preferably contains a compound containing nitrogen and an element M, and still more preferably contains a compound represented by AαMβN (A is at least one element selected from the group consisting of Li, Na, and K. M is the element M, and α and β are numerical values that give a stoichiometric ratio according to the type of the element M). Examples of such a compound include a raw material compound containing lithium, nitrogen, and an element M (hereinafter, it is also described as a Li-M-N-containing compound). The Li-M-N-containing compound can be produced by the following procedure. First, $Li_3N$ and a nitride of the element M are prepared and mixed in a mortar or the like. Next, a pellet of the mixed raw material compound is produced. Next, the pellet is heat-treated to produce a Li-M-N-containing compound. The means for preparing the Li-M-N-containing compound is not limited thereto, and the Li-M-N-containing compound may be prepared by other methods. For example, the raw materials of the Li-M-N-containing compound may be two or more compounds containing any of lithium, element M, and nitrogen. The Li-M-N-containing compound may be prepared by a mechanical milling treatment. As the Li-M-N-containing compound, one industrially produced and sold may be prepared.

As the Li-M-N-containing compound, a lithium composite nitride of the element M is suitably used. Examples of the lithium composite nitride of the element M include lithium composite nitrides such as $Li_{3/2}Al_{1/2}N$, $Li_{3/2}B_{1/2}N$, $Li_{5/3}Si_{1/3}N$, $Li_{9/5}Si_{3/10}N$, $LiMgN$, $LiHf_{1/2}N$, $Li_{3/2}Sc_{1/2}N$, $LiZr_{1/2}N$, $Li_{5/3}Ti_{1/3}N$, $Li_{4/3}Ta_{1/3}N$, $Li_{7/4}Ta_{1/4}N$, $Li_{7/4}Nb_{1/4}N$, and $LiC_{1/2}N$. Among these, $Li_{3/2}Al_{1/2}N$, $Li_{3/2}B_{1/2}N$ and $Li_{5/3}Si_{1/3}N$ are preferable because they are easily available. In addition, $Li_{3/2}Al_{1/2}N$ is particularly preferable from the viewpoint of suppressing precipitation of $Li_2S$, and $Li_{3/2}B_{1/2}N$ and $Li_{5/3}Si_{1/3}N$ are particularly preferable from the viewpoint of improving thermal stability of HICP. $Li_{3/2}Al_{1/2}N$ and $Li_{3/2}B_{1/2}N$ are particularly preferable from the viewpoint of suppressing discharge of nitrogen to the outside of the system in the production process of the solid electrolyte.

The composition may contain a compound containing the element M and a compound containing nitrogen. Examples of the compound containing the element M include oxides of the element M, sulfides of the element M, nitrides of the element M, and alloys of the element M and lithium. Examples of the sulfide of the element M include $Al_2S_3$ and $SiS_2$. Examples of the nitride of the element M include $AlN$, $Si_3N_4$, $BN$, and $Mg_3N_2$. The compound containing the element M may be used singly, or two or more thereof may be used in mixture.

The element M in the production method is not particularly limited as long as it is at least one element selected from the group consisting of aluminum, tantalum, silicon, scandium, magnesium, niobium, boron, hafnium, carbon, zirconium, and titanium. Among these, the element M is preferably any one of aluminum, tantalum, silicon, scandium, magnesium, niobium, boron, hafnium, and carbon, and more preferably any one of aluminum, tantalum, silicon, scandium, magnesium, niobium, and boron, from the viewpoint of more reliably suppressing the discharge of nitrogen to the outside of the system in the production process of the solid electrolyte. In addition, the element M is still more preferably any of aluminum, silicon, and boron because they are easily available. In particular, the element M may be aluminum.

Examples of the nitrogen-containing compound include $Li_3N$, $PN$, $P_3N_5$, $S_4N_4$, $S_2N_2$, and $S_4N_2$, in addition to the above-described Li-M-N-containing compound. Among these, $Li_3N$ is preferable. The compound containing nitrogen may be used singly, or two or more thereof may be used in mixture.

Specific forms of the composition prepared in the preparation step include the following (i) and (ii).

(i) Mixture of sulfide glass formed of $Li_2S$, $P_2S_5$, LiX (halide of lithium) and $Li_{3/2}Al_{1/2}N$ (an example of a Li-M-N-containing compound), and $Li_{4/3}Sn_{1/3}S_{4/3}$ (an example of a Li—Sn—S-containing compound)

(ii) Mixture of $Li_2S$, $P_2S_5$, LiX (halide of lithium), $Li_{3/2}Al_{1/2}N$ (an example of a Li-M-N-containing compound), and $SnS_2$ In the composition (mixture) of (i) above, $Li_2S$, $P_2S_5$, LiX (halide of lithium), and $Li_{3/2}Al_{1/2}N$ (an example of a Li-M-N-containing compound), which are components other than $Li_{4/3}Sn_{1/3}S_{4/3}$, are glassy (sulfide glass) in advance by the mechanical milling treatment or the like. This mechanical milling can be performed by the method described above as one of the procedures for synthesizing the Li—Sn—S-containing compound. In addition, $Li_{4/3}Sn_{1/3}S_{4/3}$ (an example of a Li—Sn—S-containing compound) is also preferably glassy by a synthesis procedure by the mechanical milling treatment or the like. As described above, when the composition is a mixture of glassy compounds, a solid electrolyte with less crystal phase with low water resistance such as $Li_2S$ and high ionic conductivity can be obtained. More specifically, the preparation step may be a step of preparing a composition containing a first glassy compound containing lithium, phosphorus, and halogen and a second glassy compound containing lithium, tin, and sulfur (Li—Sn—S-containing compound). The first glassy compound and the second glassy compound may further contain other constituent elements.

On the other hand, the composition (mixture) of (ii) above does not contain a Li—Sn—S-containing compound, but contains a compound as a raw material thereof. In addition, each compound contained in the composition of (ii) above is not glassy in the preparation step, and is made glassy only in the next reaction step. The composition of (ii) above may contain a glassy compound. When the composition of (ii) above is used, the synthesis procedure can be simplified, so that productivity is enhanced.

Specific forms of the composition prepared in the preparation step also include, for example, a composition obtained by removing the Li-M-N-containing compound from the compositions of (i) and (ii) above, that is, (i')$_a$ mixture of sulfide glass formed of $Li_2S$, $P_2S_5$, and LiX (halide of lithium), and $Li_{4/3}Sn_{1/3}S_{4/3}$ (an example of a Li—Sn—S-containing compound), and (ii') a mixture of $Li_2S$, $P_2S_5$, LiX (halide of lithium), and $SnS_2$.

The specific content and suitable content of elements (lithium, phosphorus, sulfur, halogen, tin, and the like) in the composition prepared in the preparation step are the same as the specific content and suitable content of elements (lithium, phosphorus, sulfur, halogen, tin, and the like) in the solid electrolyte according to an embodiment of the present invention described above. In addition, the composition may further contain elements other than lithium, phosphorus, sulfur, halogen, tin, nitrogen, and the element M.

(Reaction Step)

In this step, the composition is reacted, for example, by performing mechanical milling on the composition to obtain an intermediate. The means for obtaining the intermediate is not limited thereto, and the intermediate may be obtained by other methods. For example, instead of mechanical milling, a melt quenching method or the like may be performed. The mechanical milling in the present reaction step can be performed by the method described above as one of the procedures for synthesizing the Li—Sn—S-containing compound.

The intermediate obtained in the reaction step may have a crystal structure, but is preferably a so-called sulfide glass. When the intermediate is sulfide glass, a sulfide solid electrolyte with less crystal phase with low stability such as $Li_2S$, in which elements are highly dispersed, can be obtained.

(Heat Treatment Step)

In this step, the intermediate is heated (heat-treated) at a temperature equal to or higher than the crystallization temperature. Thereby, at least a part of the intermediate is crystallized, preferably crystallized into a phase of HICP and $Li_{4/3}Sn_{1/3}S_{4/3}$ (LSS), to obtain a solid electrolyte as a target product. The heating (heat treatment) may be performed under a reduced pressure atmosphere or an inert gas atmosphere. The heating temperature range is, for example, preferably 160° C. or higher and 400° C. or lower, more preferably 170° C. or higher and 350° C. or lower, and still more preferably 180° C. or higher and 300° C. or lower. By setting the heating temperature to be equal to or greater than the lower limit, crystallization sufficiently proceeds, and a solid electrolyte with higher ionic conductivity or the like is obtained. In addition, by setting the heating temperature to be equal to or less than the upper limit, a target crystal phase can be effectively precipitated.

(Method for Selecting Raw Material Compound $A_\alpha M_\beta N$)

As described above, by using the compound represented by $A_\alpha M_\beta N$, which is an example of the compound containing nitrogen and the element M, as a raw material, it is possible to suppress release of nitrogen to the outside of the system in the process of producing the solid electrolyte. First principle calculation can be used to select the element A and the element M from which such effect is obtained. Hereinafter, a method for selecting a raw material compound used for producing the solid electrolyte will be described.

In the present embodiment, a raw material compound is selected by the procedures shown in (1) to (3).

(1) A candidate material containing nitrogen, an element A', and an element M', in which the first nearest atoms of the element A' and the element M' are nitrogen, is selected.

(2) Defect generation energy of nitrogen $E_{Ndefect}$ in the inside of the candidate material is calculated using first principle calculation.

(3) When the $E_{Ndefect}$ is 4.00 eV or more, the candidate material is selected as the raw material compound.

The first principle calculation is a calculation method of predicting properties in a non-empirical manner, which is an approach that is capable of calculating the total energy of a model including atoms with known atomic numbers and spatial coordinates, and the energy band structure of electrons. The calculation of the force acting on the atoms allows structural optimization, and allows the lattice constant, the stable structure at 0 K, the band gap, and the like to be calculated. The calculation method includes two roughly classified types of "wave function theory" system and "density functional theory" system. The calculation method used in the specification of the present application is based on the density functional theory.

Defect generation energy of nitrogen $E_{Ndefect}$ refers to an energy value required for desorbing nitrogen from the crystal structure to generate a defect.

The defect generation energy of nitrogen refers to a value calculated using the total energy of a crystal structure including no defect $E_{perfect}$, the total energy of the crystal structure including a nitrogen defect $E_{Nvacancy}$, and chemical potential of the nitrogen atom $\mu_N$, which is defined by the following formula (1).

$$E_{Ndefect}=(E_{Nvacancy}+\mu_N)-E_{perfect} \quad (1)$$

More specifically, the procedure for calculating the defect generation energy of nitrogen $E_{Ndefect}$ is as follows.

(a) Obtain the composition and crystal structure of candidate material are obtained.

(b) Calculate the chemical potential of the nitrogen atom $\mu_N$ to be desorbed as a defect.

(c) Calculate the total energy of the crystal structure not including no defect $E_{perfect}$ by structure optimization calculation.

(d) Calculate the total energy of the crystal structure including a nitrogen defect $E_{Nvacancy}$ by structure optimization calculation.

(e) Calculate the defect generation energy of nitrogen $E_{Ndefect}$ in accordance with the formula (1).

When there are multiple nitrogen-occupied sites in the crystal structure of the candidate material, $E_{Ndefect}$ is calculated for each nitrogen-occupied site, and one that has the lowest value is used as $E_{Ndefect}$ of the candidate material.

The composition and crystal structure of the candidate material can be arbitrarily selected from those available from known publications, databases, and the like. The candidate material is not particularly limited as long as it is a compound containing nitrogen, the element A', and the element M', but is preferably a compound that is stable under normal temperature and normal pressure.

In the present embodiment, the element A' is a metal element. The element M' is an element other than nitrogen belonging to any one of Groups 2 to 15 of the periodic table and is an element different from the element A'. N is a nitrogen element.

The element A' is not particularly limited, but is preferably any of an alkali metal element, an alkaline earth metal element, and an aluminum element, more preferably at least one selected from lithium, sodium, potassium, magnesium, calcium, and aluminum, and still more preferably lithium. This makes it easy to operate the solid electrolyte as a solid electrolyte for an energy storage device.

In the present embodiment, the defect generation energy of nitrogen is calculated for the candidate material represented by $Li_\alpha M'_\beta N$ ($\alpha$ and $\beta$ are numerical values that give a stoichiometric ratio according to the type of the element M) and $Li_3N$. As an example, lithium is selected as the element A'. Boron, magnesium, aluminum, silicon, phosphorus, calcium, strontium, titanium, vanadium, chromium, manganese, iron, cobalt, nickel, zinc, gallium, germanium, strontium, yttrium, zirconium, niobium, indium, tin, cerium, hafnium, tantalum, and carbon are selected as the element M'.

In the first principle calculation, a calculation software of Vienna Ab-initio Simulation Package (VASP) is used. Calculation conditions are as follows. The k point is set such that the k-resolution value is approximately 1000. The k-resolution is the product of the number of atoms in the model and the k points in a, b, and c-axis directions.

Cut-off energy of plane wave basis function: 520 eV

Approximation of exchange-correlation interaction: GGA+U

Pseudopotential: PAW (PBEsol)

k point: k-resolution≈1000

Convergence condition for SCF calculation: $10^{-4}$ eV

Occupancy of each atomic site (Occ.): 1

Hubbard $U_{eff}$ values shown in Table 1 are used as the calculation conditions for the first principle calculation for materials containing transition metal elements vanadium, chromium, manganese, iron, cobalt, and nickel where the 3d orbitals are the outermost shell orbitals, and the 3d orbitals are not closed shells in the states of cations with valences considered stable, with electrons in the 3d orbitals. Thus, the effect of electron localization in the d orbitals is reflected in the calculation. The Hubbard $U_{eff}$ values shown in Table 1 are cited from the calculation conditions for the first principle calculation performed in the crystalline structure database: Materials Project (https://materialsproject.org/#search/materials) (as of Aug. 22, 2019). The $U_{eff}$ values are obtained by searching the database for materials containing vanadium, chromium, manganese, iron, cobalt, and nickel.

TABLE 1

| Element | $U_{eff}$/eV |
| --- | --- |
| V | 3.25 |
| Cr | 3.70 |
| Mn | 3.90 |
| Fe | 5.30 |
| Co | 3.32 |
| Ni | 6.20 |

In addition, in the procedure (d), the calculation model cell is designed such that lattice constants a, b, and c are all approximately 10 Å to the extent that the total number of atoms is not more than 200, in order to reduce the interaction between nitrogen defects. Table 2 shows lattice constants used for calculation of some candidate materials.

TABLE 2

| Composition | Number of atom/— | a/Å | b/Å | c/Å | α/deg. | β/deg. | γ/deg. | Volume/Å³ |
| --- | --- | --- | --- | --- | --- | --- | --- | --- |
| $Li_3N$ | 108 | 10.8 | 10.8 | 11.5 | 90.0 | 90.0 | 120.0 | 1168.6 |
| $Li_{3/2}Al_{1/2}N$ | 192 | 8.20 | 16.3 | 16.3 | 109.5 | 109.5 | 109.5 | 1680.7 |
| $Li_{3/2}B_{1/2}N$ | 96 | 10.2 | 7.00 | 13.4 | 90.0 | 112.9 | 90.0 | 885.1 |

Table 3 shows the element M', and the chemical composition and defect generation energy of nitrogen $E_{Ndefect}$ for each candidate material.

TABLE 3

| System | Composition | Defect element | $E_{Ndefect}$/eV |
| --- | --- | --- | --- |
| — | Li3N | N | 2.94 |
| B | $Li_{3/2}B_{1/2}N$ | N | 4.35 |
| C | $LiC_{1/2}N$ | N | 4.12 |
| Mg | LiMgN | N | 4.38 |
| Al | $Li_{3/2}Al_{1/2}N$ | N | 5.36 |
| Si | $Li_{5/3}S_{1/3}N$ | N | 4.48 |
| P | $Li_{7/4}P_{1/4}N$ | N | 4.11 |
| Ca | LiCaN | N | 3.28 |
| Sc | $Li_{3/2}Sc_{1/2}N$ | N | 4.48 |
| Ti | $Li_{5/3}Ti_{1/3}N$ | N | 4.00 |
| V | $Li_{7/4}V_{1/4}N$ | N | 3.88 |
| Cr | $Li_{3/2}Cr_{1/4}N$ | N | 2.32 |
| Mn | $Li_{7/4}Mn_{1/4}N$ | N | 2.23 |
| Fe | $Li_{3/2}Fe_{1/2}N$ | N | −4.45 |
| Co | $Li_{3/2}Co_{1/2}N$ | N | 1.17 |
| Ni | $Li_{5/3}NiN$ | N | −4.05 |
| Zn | LiZnN | N | 2.86 |
| Ga | $Li_{3/2}Ga_{1/2}N$ | N | 3.35 |
| Ge | $Li_{5/3}Ge_{1/3}N$ | N | 2.72 |
| Sr | LiSrN | N | 2.16 |
| Y | $Li_{3/2}Y_{1/2}N$ | N | 3.75 |
| Zr | $LiZr_{1/2}N$ | N | 4.07 |
| Nb | $Li_{7/4}Nb_{1/4}N$ | N | 4.37 |
| In | $Li_{3/2}In_{1/2}N$ | N | 1.64 |
| Sn | $LiSn_{1/2}N$ | N | 3.00 |
| Ce | $LiCe_{1/2}N$ | N | 3.12 |
| Hf | $LiHf_{1/2}N$ | N | 4.33 |
| Ta | $Li_{7/4}Ta_{1/4}N$ | N | 4.69 |

From Table 3, it is found that the defect generation energy of nitrogen $E_{Ndefect}$ in $Li_3N$, in which nitrogen defects are likely to be generated, is 2.94 eV. In addition, it is found that each element of vanadium, yttrium, gallium, calcium, cerium, tin, zinc, germanium, chromium, manganese, strontium, indium, cobalt, nickel, and iron has a defect generation energy of nitrogen $E_{Ndefect}$ in LiαMβN as small as 3.88 eV or less. Therefore, the candidate materials containing any of vanadium, yttrium, gallium, calcium, cerium, tin, zinc, germanium, chromium, manganese, strontium, indium, cobalt, nickel, and iron as the element M' are predicted to be likely to generate nitrogen defects, and have a low effect of suppressing the discharge of nitrogen to the outside of the system in the production process of the solid electrolyte.

On the other hand, it is found that each element of aluminum, tantalum, silicon, scandium, magnesium, niobium, boron, hafnium, carbon, zirconium, and titanium has a defect generation energy of nitrogen $E_{Ndefect}$ in LiαMβN as large as 4.00 eV or more. Therefore, the candidate materials containing any of aluminum, tantalum, silicon, scandium, magnesium, niobium, boron, hafnium, carbon, zirconium, and titanium as the element M' are predicted to be unlikely to generate a nitrogen defect, and be extremely likely to exhibit the effect of the present invention of suppressing the discharge of nitrogen to the outside of the system in the production process of the solid electrolyte.

The candidate material is, as the value of the defect generation energy of nitrogen $E_{Ndefect}$ is larger, predicted to, be less likely to generate a nitrogen defect, and be capable of further suppressing the discharge of nitrogen to the outside of the system in the production process of the solid electrolyte. Therefore, in the present embodiment, the defect generation energy of nitrogen $E_{Ndefect}$ of the candidate material is 4.00 eV or more, preferably 4.10 eV or more, more preferably 4.20 eV or more, still more preferably 4.30 eV or more, and particularly preferably 4.35 eV or more.

In the present embodiment, the calculation is performed for the case of containing lithium as the element A'. More specifically, the first principle calculation is performed with $Li_\alpha M'_\beta N$ as a model. However, the element A' has only to be a metal element, and for example, a candidate material containing any of sodium, potassium, magnesium, calcium, and aluminum may be selected as the element A', and a raw material compound may be selected using the first principle calculation.

<Energy Storage Device>

Hereinafter, as an embodiment of the energy storage device of the present invention, an all-solid-state battery will be described as a specific example. An energy storage device 10 of FIG. 1 is an all-solid-state battery, and is a secondary battery in which a positive electrode layer 1 and a negative electrode layer 2 are arranged with an isolation layer 3 interposed therebetween. The positive electrode layer 1 includes a positive electrode substrate 4 and a positive active material layer 5, and the positive electrode substrate 4 is an outermost layer of the positive electrode layer 1. The negative electrode layer 2 includes a negative electrode substrate 7 and a negative active material layer 6, and the negative electrode substrate 7 is an outermost layer of the negative electrode layer 2. In the energy storage device 10 shown in FIG. 1, the negative active material layer 6, the isolation layer 3, the positive active material layer 5, and the positive electrode substrate 4 are stacked in this order on the negative electrode substrate 7.

The energy storage device 10 contains the solid electrolyte according to an embodiment of the present invention in at least one of the positive electrode layer 1, the negative electrode layer 2, and the isolation layer 3. More specifically, the solid electrolyte according to an embodiment of the present invention is contained in at least one of the positive active material layer 5, the negative active material layer 6, and the isolation layer 3. Since the energy storage device 10 contains the solid electrolyte having high water resistance, the reaction with water is suppressed even when the energy storage device 10 is exposed to the atmosphere in the manufacturing process, and good charge-discharge performance can be exhibited.

The energy storage device 10 may also use a solid electrolyte other than the solid electrolyte according to an embodiment of the present invention. Examples of other solid electrolytes include sulfide-based solid electrolytes, oxide-based solid electrolytes, dry polymer electrolytes, gel polymer electrolytes, and pseudo solid electrolytes other than the solid electrolyte, and the sulfide-based solid electrolytes are preferable. In addition, a plurality of different types of solid electrolytes may be contained in one layer of the energy storage device 10, or different solid electrolytes may be contained in each layer.

Examples of the sulfide-based solid electrolyte include $Li_2S$—$P_2S_5$, $Li_2S$—$P_2S_5$—$LiI$, $Li_2S$—$P_2S_5$—$LiCl$, $Li_2S$—$P_2S_5$—$LiBr$, $Li_2S$—$P_2S_5$—$Li_2O$, $Li_2S$—$P_2S_5$—$Li_2O$—$LiI$, $Li_2S$—$P_2S_5$—$Li_3N$, $Li_2S$—$SiS_2$, $Li_2S$—$SiS_2$—$LiI$, $Li_2S$—$SiS_2$—$LiBr$, $Li_2S$—$SiS_2$—$LiCl$, $Li_2S$—$SiS_2$—$B_2S_3$—$LiI$, $Li_2S$—$SiS_2$—$P_2S_5$—$LiI$, $Li_2S$—$B_2S_3$, $Li_2S$—$P_2S_5+Z_mS_{2n}$ (provided that m and n are positive numbers, and Z is any of Ge, Zn, and Ga), $Li_2S$—$GeS_2$, $Li_2S$—$SiS_2$—$Li_3PO_4$, $Li_2S$—$SiS_2$—$Li_xMO_y$ (provided that x and y are positive numbers, and M is any of P, Si, Ge, B, Al, Ga, and In), and $Li_{10}GeP_2S_{12}$.

[Positive Electrode Layer]

The positive electrode layer 1 includes the positive electrode substrate 4 and the positive active material layer 5 stacked on a surface of the positive electrode substrate 4. The positive electrode layer 1 may have an intermediate layer between the positive electrode substrate 4 and the positive active material layer 5. The intermediate layer can be, for example, a layer containing conductive particles and a resin binder.

(Positive Electrode Substrate)

The positive electrode substrate 4 has conductivity. Having "conductivity" means having a volume resistivity of $10^7$ Ω·cm or less that is measured in accordance with JIS-H-0505 (1975), and the term "non-conductivity" means that the volume resistivity is more than $10^7$ Ω·cm. As the material of the positive electrode substrate 4, a metal such as aluminum, titanium, tantalum, indium, or stainless steel, or an alloy thereof is used. Among these, aluminum or an aluminum alloy is preferable from the viewpoint of electric potential resistance, high conductivity, and costs. Examples of the positive electrode substrate 4 include a foil and a deposited film, and a foil is preferable from the viewpoint of costs. Accordingly, the positive electrode substrate 4 is preferably an aluminum foil or an aluminum alloy foil. Examples of aluminum and the aluminum alloy include A1085P and A3003P specified in JIS-H-4000 (2014).

The average thickness of the positive electrode substrate 4 is preferably 3 μm or more and 50 μm or less, more preferably 5 μm or more and 40 μm or less, still more preferably 8 μm or more and 30 μm or less, and particularly preferably 10 μm or more and 25 μm or less. When the average thickness of the positive electrode substrate 4 is within the above-described range, it is possible to enhance the energy density per volume of the energy storage device 10 while increasing the strength of the positive electrode substrate 4. The "average thickness" of the positive electrode substrate 4 and the negative electrode substrate 7 described later refers to a value obtained by dividing the mass of a substrate having a predetermined area by the true density and area of the substrate.

The intermediate layer is a layer arranged between the positive electrode substrate 4 and the positive active material layer 5. The intermediate layer contains conductive particles such as carbon particles to reduce contact resistance between the positive electrode substrate 4 and the positive active material layer 5. The configuration of the intermediate layer is not particularly limited, and includes, for example, a resin binder and conductive particles.

(Positive Active Material Layer)

The positive active material layer 5 contains a positive active material. The positive active material layer 5 can be formed of a so-called positive composite containing a positive active material. The positive active material layer 5 may contain a mixture or a composite containing a positive active material and a solid electrolyte. The positive active material layer 5 may contain optional components such as a conductive agent, a binder (binding agent), a thickener, a filler, and the like as necessary. One or two or more of these optional components may not be substantially contained in the positive active material layer 5.

The positive active material contained in the positive active material layer 5 can be appropriately selected from known positive active materials usually used for lithium ion secondary batteries and all-solid-state batteries. As the positive active material, a material capable of occluding and releasing lithium ions is usually used. Examples of the positive active material include lithium transition metal composite oxides having an α-NaFeO₂-type crystal structure, lithium transition metal composite oxides having a spinel-type crystal structure, polyanion compounds, chalcogenides, and sulfur. Examples of the lithium transition metal composite oxide having an α-NaFeO₂-type crystal structure include $Li[Li_xNi_{1-x}]O_2$ ($0 \leq x < 0.5$), $Li[Li_xNi_yCo_{(1-x-y)}]O_2$ ($0 \leq x < 0.5$, $0 < y < 1$), $Li[Li_xNi_yMn_\beta Co_{(1-x-y-\beta)}]O_2$ ($0 \leq x < 0.5$, $0 < y$, $0 < \beta$, $0.5 < y + \beta < 1$). Examples of the lithium-transition metal composite oxides having a spinel-type crystal structure include $Li_xMn_2O_4$ and $Li_xNi_yMn_{(2-y)}O_4$. Examples of the polyanion compounds include $LiFePO_4$, $LiMnPO_4$, $LiNiPO_4$, $LiCoPO_4$, $Li_3V_2(PO_4)_3$, $Li_2MnSiO_4$, and $Li_2CoPO_4F$. Examples of the chalcogenides include titanium disulfide, molybdenum disulfide, and molybdenum dioxide. A part of atoms or polyanions in these materials may be substituted with atoms or anion species composed of other elements. A surface of the positive active material may be coated with an oxide such as lithium niobate, lithium titanate, or lithium phosphate. In the positive active material layer, one of these positive active materials may be used singly, or two or more of these positive active materials may be mixed and used.

The average particle size of the positive active material is preferably 0.1 μm or more and 20 μm or less, for example. By setting the average particle size of the positive active material to be equal to or greater than the lower limit, the positive active material is easily manufactured or handled. By setting the average particle size of the positive active material to be equal to or less than the upper limit, the electron conductivity of the positive active material layer 5 is improved. Here, the term "average particle size" means a value at which a volume-based integrated distribution calculated in accordance with JIS-Z-8819-2 (2001) is 50% based on a particle size distribution measured by a laser diffraction/scattering method for a diluted solution obtained by diluting particles with a solvent in accordance with JIS-Z-8825 (2013).

A crusher, a classifier, and the like are used to obtain the particles in a predetermined shape. Examples of a crushing method include a method in which a mortar, a ball mill, a sand mill, a vibratory ball mill, a planetary ball mill, a jet mill, a counter jet mill, a whirling airflow type jet mill, or a sieve or the like is used. At the time of crushing, wet type crushing in the presence of water or an organic solvent such as heptane can also be used. As a classification method, a sieve or a wind force classifier or the like is used based on the necessity both in dry manner and in wet manner.

The content of the positive electrode active material in the positive active material layer 5 is preferably 10% by mass or more and 95% by mass or less, more preferably 30% by mass or more, and still more preferably 50% by mass or more. By setting the content of the positive active material within the above range, the electric capacity of the energy storage device 10 can be further increased.

When the positive active material layer 5 contains a solid electrolyte, the content of the solid electrolyte is preferably 10% by mass or more and 90% by mass or less, more preferably 20% by mass or more and 70 mass % or less, and may be still more preferably 50% by mass or less. By setting the content of the solid electrolyte within the above range, the electric capacity of the energy storage device can be further increased. When the solid electrolyte according to an embodiment of the present invention is used for the positive active material layer 5, the content of the solid electrolyte according to an embodiment of the present invention in an all solid electrolyte in the positive active material layer 5 is preferably 50% by mass or more, more preferably 70 by mass or more %, still more preferably 90% by mass or more, and even more preferably substantially 100% by mass.

A mixture of the positive active material and the solid electrolyte is a mixture prepared by mixing the positive active material, the solid electrolyte, and the like by mechanical milling or the like. For example, the mixture of the positive active material and the solid electrolyte can be obtained by mixing a particulate positive active material, a particulate solid electrolyte, and the like. Examples of the composite of the positive active material and the solid electrolyte include a composite having a chemical or physical bond between the positive active material and the solid electrolyte or the like, and a composite obtained by mechanically combining the positive active material and the solid electrolyte or the like. The composite has the positive active material, the solid electrolyte, and the like present in one particle, and examples thereof include those in which the positive active material, the solid electrolyte, and the like form an aggregated state, and those in which a film containing the solid electrolyte or the like is formed on at least a part of a surface of the positive active material.

The conductive agent is not particularly limited as long as it is a material exhibiting conductivity. Examples of such a conductive agent include carbonaceous materials, metals, and conductive ceramics. Examples of the carbonaceous materials include graphitized carbon, non-graphitized carbon, and graphene-based carbon. Examples of the non-graphitized carbon include carbon nanofibers, pitch-based carbon fibers, and carbon black. Examples of the carbon black include furnace black, acetylene black, and ketjen black. Examples of the graphene-based carbon include graphene, carbon nanotubes (CNTs), and fullerene. Examples of the shape of the conductive agent include a powdery shape and a fibrous shape. As the conductive agent, one of these materials may be used singly or two or more of these materials may be used in mixture. These materials may be composited and then used. For example, a material obtained by compositing carbon black with CNT may be used. Among these materials, carbon black is preferable from the viewpoint of electron conductivity and coatability, and in particular, acetylene black is preferable.

The content of the conductive agent in the positive active material layer 5 is preferably 1% by mass or more and 10% by mass or less, more preferably 3% by mass or more and 9% by mass or less. By setting the content of the conductive agent within the above range, the electric capacity of the energy storage device 10 can be increased.

Examples of the binder include thermoplastic resins such as fluororesin (polytetrafluoroethylene (PTFE), polyvinylidene fluoride (PVDF), and the like), polyethylene, polypropylene, polyimide, poly(meth)acrylic acid, poly(meth) acrylic acid ester, and poly(meth)acrylamide; elastomers such as ethylene-propylene-diene rubber (EPDM), sulfonated EPDM, styrene-butadiene rubber (SBR), and fluororubber; and polysaccharide polymers.

The content of the binder in the positive active material layer 5 is preferably 1% by mass or more and 10% by mass or less, and more preferably 3% by mass or more and 9% by mass or less. By setting the content of the binder within the above range, the active material can be stably held.

Examples of the thickener include polysaccharide polymers such as carboxymethylcellulose (CMC) and methylcellulose. When the thickener has a functional group that is reactive with lithium and the like, the functional group may be deactivated by methylation or the like in advance.

The filler is not particularly limited. Examples of the filler include polyolefins such as polypropylene and polyethylene, inorganic oxides such as silicon dioxide, aluminum oxide, titanium dioxide, calcium oxide, strontium oxide, barium oxide, magnesium oxide and aluminosilicate, hydroxides such as magnesium hydroxide, calcium hydroxide and aluminum hydroxide, carbonates such as calcium carbonate, hardly soluble ionic crystals of calcium fluoride, barium fluoride, barium sulfate and the like, nitrides such as aluminum nitride and silicon nitride, and substances derived from mineral resources, such as talc, montmorillonite, boehmite, zeolite, apatite, kaolin, mullite, spinel, olivine, sericite, bentonite and mica, and artificial products thereof.

The positive active material layer 5 may contain a typical nonmetal element such as B, N, P, F, Cl, Br, or I, a typical metal element such as Li, Na, Mg, Al, K, Ca, Zn, Ga, Ge, Sn, Sr, and Ba or a transition metal element such as Sc, Ti, V, Cr, Mn, Fe, Co, Ni, Cu, Mo, Zr, Nb, or W as a component other than the positive active material, the conductive agent, the binder, the thickener, and the filler.

An average thickness of the positive active material layer 5 is preferably 30 μm or more and 1,000 μm or less, and more preferably 60 μm or more and 500 μm or less. By setting the average thickness of the positive active material layer 5 to be equal to or greater than the lower limit, an energy storage device 10 having a high energy density can be obtained. By setting the average thickness of the positive active material layer 5 to be equal to or less than the upper limit, the size of the energy storage device 10 can be reduced. The average thickness of the positive active material layer 5 is regarded as an average value of thicknesses measured at any five points. The same applies to the average thickness of the negative active material layer 6 and the isolation layer 3 described later.

[Negative Electrode Layer]

The negative electrode layer 2 has the negative electrode substrate 7 and the negative active material layer 6 disposed on the negative electrode substrate 7 directly or via an intermediate layer. The configuration of the intermediate layer is not particularly limited, and for example can be selected from the configurations exemplified for the positive electrode layer 1.

(Negative Electrode Substrate)

The negative electrode substrate 7 exhibits conductivity. As the material of the negative electrode substrate 7, a metal such as copper, nickel, stainless steel, nickel-plated steel, or aluminum, or an alloy thereof is used. Among these, copper or a copper alloy is preferable. Examples of the negative electrode substrate include a foil and a vapor deposited film, and a foil is preferable from the viewpoint of cost. Therefore, the negative electrode substrate is preferably a copper foil or a copper alloy foil. Examples of the copper foil include a rolled copper foil and an electrolytic copper foil.

The average thickness of the negative electrode substrate 7 is preferably 2 μm or more and 35 μm or less, more preferably 3 μm or more and 30 μm or less, still more preferably 4 μm or more and 25 μm or less, and particularly preferably 5 μm or more and 20 μm or less. By setting the average thickness of the negative electrode substrate 7 to be equal to or greater than the lower limit, the strength of the negative electrode substrate 7 can be increased. By setting the average thickness of the negative electrode substrate 7 to be equal to or less than the upper limit, the energy density per volume of the energy storage device 10 can be increased.

(Negative Active Material Layer)

The negative active material layer 6 contains a negative active material. The negative active material layer 6 can be formed of a so-called negative composite containing a negative active material. The negative active material layer 6 may contain a mixture or a composite containing a negative active material and a solid electrolyte. The negative active material layer 6 contains optional components such as a conductive agent, a binder, a thickener, a filler, or the like as necessary. The types and suitable contents of the optional components in the negative active material layer 6 are the same as those of the optional components in the positive active material layer 5 described above. One or two or more of these optional components may not be substantially contained in the negative active material layer 6.

The negative active material layer 6 may contain a typical nonmetal element such as B, N, P, F, Cl, Br, or I, a typical metal element such as Li, Na, Mg, Al, K, Ca, Zn, Ga, Ge, Sn, Sr, and Ba or a transition metal element such as Sc, Ti, V, Cr, Mn, Fe, Co, Ni, Cu, Mo, Zr, Ta, Hf, Nb, or W as a component other than the negative active material, the conductive agent, the binder, the thickener, and the filler.

The negative active material can be appropriately selected from known negative active materials usually used for lithium ion secondary batteries and all-solid-state batteries. As the negative active material, a material capable of occluding and releasing lithium ions is usually used. Examples of the negative active material include metallic Li; metals or metalloids such as Si and Sn; metal oxides or metalloid oxides such as an Si oxide, a Ti oxide, and an Sn oxide; titanium-containing oxides such as $Li_4Ti_5O_{12}$, $LiTiO_2$, and $TiNb_2O_7$; a polyphosphoric acid compound; silicon carbide; and carbon materials such as graphite and non-graphitic carbon (easily graphitizable carbon or hardly graphitizable carbon). Among these materials, graphite and non-graphitic carbon are preferable. In the negative active material layer 6, one of these materials may be used singly, or two or more of these materials may be used in mixture.

The term "graphite" refers to a carbon material in which an average grid distance ($d_{002}$) of a (002) plane determined by an X-ray diffraction method before charge-discharge or in a discharged state is 0.33 nm or more and less than 0.34 nm. Examples of the graphite include natural graphite and artificial graphite. Artificial graphite is preferable from the viewpoint that a material having stable physical properties can be obtained.

The term "non-graphitic carbon" refers to a carbon material in which the average lattice distance ($d_{002}$) of the (002) plane determined by the X-ray diffraction method before charge-discharge or in the discharged state is 0.34 nm or more and 0.42 nm or less. Examples of the non-graphitic carbon include hardly graphitizable carbon and easily graphitizable carbon. Examples of the non-graphitic carbon include a material derived from resin, a material derived from petroleum pitch, and a material derived from alcohol.

Here, the "discharged state" refers to a state where an open circuit voltage is 0.7 V or more in a unipolar battery using a negative electrode, containing a carbon material as a negative active material as a working electrode and using metallic Li as a counter electrode. Since the potential of the metallic Li counter electrode in an open circuit state is substantially equal to an oxidation/reduction potential of Li, the open circuit voltage in the unipolar battery is substantially equal to the potential of the negative electrode containing the carbon material with respect to the oxidation/reduction potential of Li. That is, the fact that the open circuit voltage in the unipolar battery is 0.7 V or more means that lithium ions that can be occluded and released in association with charge-discharge are sufficiently released from the carbon material that is the negative active material.

The "hardly graphitizable carbon" refers to a carbon material in which the $d_{002}$ is 0.36 nm or more and 0.42 nm or less.

The "easily graphitizable carbon" refers to a carbon material in which the $d_{002}$ is 0.34 nm or more and less than 0.36 nm.

The negative active material is typically particles (powder). The average particle size of the negative active material can be, for example, 1 nm or more and 100 μm or less. When the negative active material is, for example, a carbon material, the average particle size thereof may be preferably 1 μm or more and 100 μm or less. When the negative active material is a metal, a metalloid, a metal oxide, a metalloid oxide, a titanium-containing oxide, a polyphosphoric acid compound or the like, the average particle size thereof may be preferably 1 nm or more and 1 μm or less. By setting the average particle size of the negative active material to be equal to or greater than the lower limit, the negative active material is easily produced or handled. By setting the average particle size of the negative active material to be equal to or less than the upper limit, the electron conductivity of the positive active material layer is improved. A crusher or a classifier is used to obtain a powder having a predetermined particle size. The crushing method and the powder classification method can be selected from, for example, the methods exemplified for the positive electrode layer 1.

The content of the negative electrode active material in the negative active material layer 6 is preferably 10% by mass or more and 95% by mass or less, more preferably 30% by mass or more, and still more preferably 50% by mass or more. By setting the content of the negative active material within the above range, the electric capacity of the energy storage device 10 can be further increased.

When the negative active material layer 6 contains a solid electrolyte, the content of the solid electrolyte is preferably 10% by mass or more and 90% by mass or less, more preferably 20% by mass or more and 70 mass % or less, and may be still more preferably 50% by mass or less. By setting the content of the solid electrolyte within the above range, the electric capacity of the energy storage device 10 can be further increased. When the solid electrolyte according to an embodiment of the present invention is used for the negative active material layer 6, the content of the solid electrolyte according to an embodiment of the present invention in an all solid electrolyte in the negative active material layer 6 is preferably 50% by mass or more, more preferably 70 by mass or more %, still more preferably 90% by mass or more, and even more preferably substantially 100% by mass.

The mixture or composite of the negative active material and the solid electrolyte can be obtained by replacing the positive active material with the negative active material in the mixture or composite of the positive active material and the solid electrolyte described above.

An average thickness of the negative active material layer 6 is preferably 30 μm or more and 1,000 μm or less, and more preferably 60 μm or more and 500 μm or less. By setting the average thickness of the negative active material layer 6 to be equal to or greater than the lower limit, an energy storage device 10 having a high energy density can be obtained. By setting the average thickness of the negative active material layer 6 to be equal to or less than the upper limit, the size of the energy storage device 10 can be reduced.

[Isolation Layer]

The isolation layer 3 contains a solid electrolyte. As the solid electrolyte contained in the isolation layer 3, various solid electrolytes can be used in addition to the solid electrolyte according to an embodiment of the present invention described above, and among them, it is preferable to use a sulfide-based solid electrolyte. The content of the solid electrolyte in the isolation layer 3 is preferably 70% by mass or more, more preferably 90 by mass or more %, still more preferably 99% by mass or more, and even more preferably substantially 100% by mass in some cases. When the solid electrolyte according to an embodiment of the present invention is used for the isolation layer 3, the content of the solid electrolyte according to an embodiment of the present invention in an all solid electrolyte in the isolation layer 3 is preferably 50% by mass or more, more preferably 70 by mass or more %, still more preferably 90% by mass or more, and even more preferably substantially 100% by mass.

The isolation layer 3 may contain optional components such as an oxide such as $Li_3PO_4$, a halogen compound, a binder, a thickener, and a filler. The optional components such as a binder, a thickener, and a filler can be selected from the materials exemplified for the positive active material layer 5.

An average thickness of the isolation layer 3 is preferably 1 μm or more and 50 μm or less, and more preferably 3 μm or more and 20 μm or less. By setting the average thickness of the isolation layer 3 to be equal to or greater than the lower limit, the positive electrode layer 1 and the negative electrode layer 2 can be highly reliably insulated. By setting the average thickness of the isolation layer 3 to be equal to or less than the upper limit, the energy density of the energy storage device 10 can be increased.

The energy storage device of the present embodiment can be mounted as an energy storage unit (battery module) configured by assembling a plurality of energy storage devices on a power source for automobiles such as electric vehicles (EV), hybrid vehicles (HEV), and plug-in hybrid vehicles (PHEV), a power source for electronic devices such as personal computers and communication terminals, or a power source for power storage, or the like. In this case, the technique according to an embodiment of the present invention may be applied to at least one energy storage device included in the energy storage unit.

Figure 2:
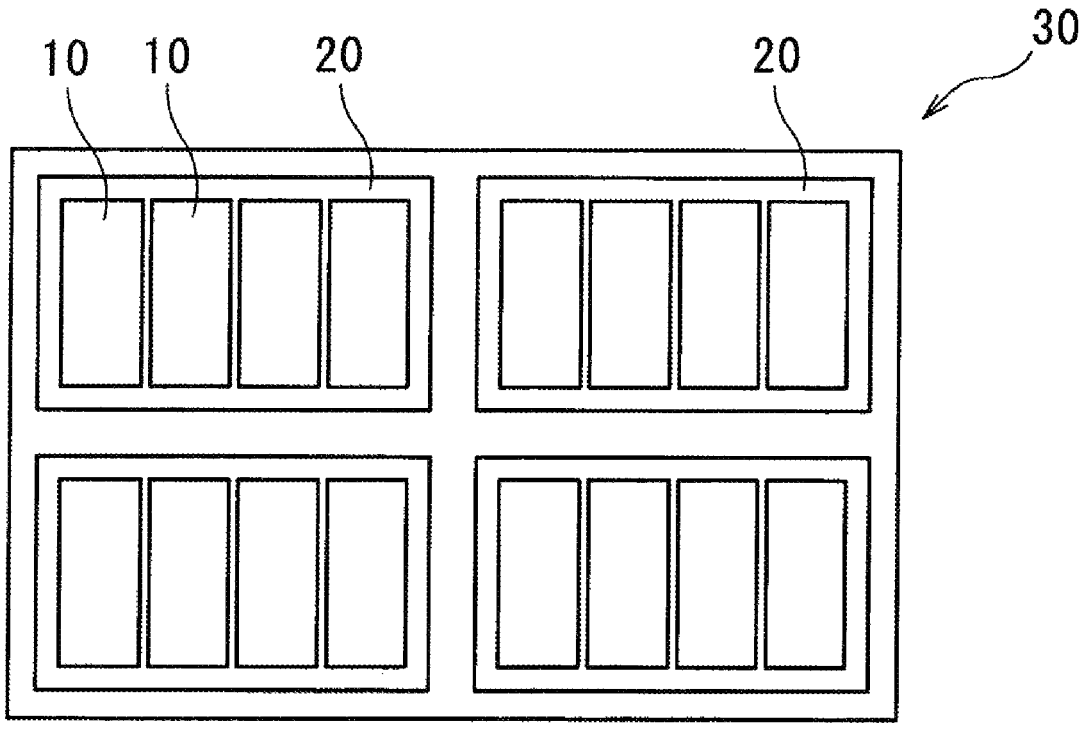
FIG. 2 is a schematic view illustrating an energy storage apparatus configured by aggregating a plurality of energy storage devices according to an embodiment of the present invention.

FIG. 2 shows an example of an energy storage apparatus 30 formed by assembling energy storage units 20 in each of which two or more electrically connected energy storage devices 10 are assembled. The energy storage apparatus 30 may include a busbar (not illustrated) for electrically connecting two or more energy storage devices 10, a busbar (not illustrated) for electrically connecting two or more energy storage units 20, and the like. The energy storage unit 20 or the energy storage apparatus 30 may include a state monitor (not illustrated) for monitoring the state of one or more energy storage devices.

<Method for Manufacturing Energy Storage Device>

The method for manufacturing an energy storage device according to an embodiment of the present invention can be performed by a generally known method except that the solid electrolyte according to an embodiment of the present invention is used for preparation of at least one of the positive electrode layer, the isolation layer, and the negative electrode layer. Specifically, the production method includes, for example, (1) providing a positive composite, (2) providing a material for an isolation layer, (3) providing a negative composite, and (4) stacking a positive electrode layer, the isolation layer, and a negative electrode layer. Hereinafter, each step will be described in detail.

(1) Step of Providing Positive Composite

In this step, a positive composite for forming a positive electrode layer (positive active material layer) is usually prepared. A method of preparing the positive composite is not particularly limited, and can be appropriately selected according to the purpose. Examples thereof include a mechanical milling treatment of a material of the positive composite, compression molding of the positive active material, and sputtering using a target material of the positive active material. When the positive composite contains a mixture or a composite containing a positive active material and a solid electrolyte, this step can include mixing the positive active material and the solid electrolyte using, for example, a mechanical milling method or the like to prepare a mixture or a composite of the positive active material and the solid electrolyte.

(2) Step of Providing Material for Isolation Layer

In this step, a material for forming the isolation layer is usually prepared. When the energy storage device is an all-solid-state battery, the material for the isolation layer is usually a solid electrolyte. The solid electrolyte as the material for the isolation layer can be prepared by a conventionally known method. For example, a predetermined material can be obtained by a mechanical milling method. The material for the isolation layer may be prepared by heating a predetermined material to a melting temperature or higher by a melt quenching method, melting and mixing both materials at a predetermined ratio, and quenching the mixture. Examples of other methods of synthesizing the material for the isolation layer include a solid phase method of sealing under reduced pressure and firing, a liquid phase method such as dissolution precipitation, a gas phase method (PLD), and firing under an argon atmosphere after mechanical milling.

(3) Step of Providing Negative Composite

In this step, a negative composite for forming a negative electrode layer (negative active material layer) is usually prepared. A specific method of preparing the negative composite is the same as that for the positive composite. When the negative composite contains a mixture or a composite containing a negative active material and a solid electrolyte, this step can include mixing the negative active material and the solid electrolyte using, for example, a mechanical milling method or the like to prepare a mixture or a composite of the negative active material and the solid electrolyte.

(Stacking Step)

In this step, for example, a positive electrode layer having a positive electrode substrate and a positive active material layer, an isolation layer, and a negative electrode layer having a negative electrode substrate and a negative active material layer are stacked. In this step, the positive electrode layer, the isolation layer, and the negative electrode layer may be sequentially formed in this order, or vice versa, and the order of formation of each layer is not particularly limited. The positive electrode layer is formed, for example, by pressure-molding a positive electrode substrate and a positive composite, the isolation layer is formed by pressure-molding the material for the isolation layer, and the negative electrode layer is formed by pressure-molding a negative electrode substrate and a negative composite. The positive electrode layer, the isolation layer, and the negative electrode layer may be stacked by pressure-molding the positive electrode substrate, the positive composite, the material for the isolation layer, the negative composite, and the negative electrode substrate at a time. The positive electrode layer and the negative electrode layer may be each formed in advance, and stacked by pressure-molding with the isolation layer.

OTHER EMBODIMENTS

The present invention is not limited to the aforementioned embodiments, and, in addition to the aforementioned aspects, can be carried out in various aspects with alterations and/or improvements being made. For example, the energy storage device according to the present invention may include a layer other than the positive electrode layer, the isolation layer, and the negative electrode layer. In the energy storage device according to the present invention, one or a plurality of layers may contain a liquid. The energy storage device according to the present invention may be a capacitor or the like in addition to the energy storage device which is a secondary battery.

EXAMPLES

Hereinafter, the present invention will be described in more detail with reference to examples, but the present invention is not limited to the following examples.

[Example 1] (2-Step Synthesis)

A sulfide solid electrolyte represented by the composition formula: $90 \, (0.80 \, (0.80 \, (0.70Li_2S \cdot 0.30P_2S_5) \cdot 0.20Li_{3/2}Al_{1/2}N) \cdot 0.12LiBr \cdot 0.08LiI) \cdot 10Li_{4/3}Sn_{1/3}S_{4/3}$ was synthesized by the following treatment.

$Li_3N$ and AlN were weighed so as to have a molar ratio of 1.2:1, mixed in a mortar, and then pelletized. Next, heat treatment was performed at 750° C. for 1 hour to prepare $Li_{3/2}Al_{1/2}N$. The main phase of the prepared $Li_{3/2}Al_{1/2}N$ was confirmed to be $Li_{3/2}Al_{1/2}N$ by X-ray diffraction measurement.

Next, in a glove box in an argon atmosphere having a dew point of −50° C. or lower, $Li_2S$ (99.98%, Aldrich), $P_2S_5$ (99%, Aldrich), $Li_{3/2}Al_{1/2}N$, LiBr (99.999%, Aldrich), and LiI (99.999%, Aldrich) were weighed so as to have a molar ratio of 44.8:19.2:16:12:8, and then mixed in a mortar. The mixed sample was charged into a closed 80 mL zirconia pot containing 160 g of zirconia balls with a diameter of 4 mm. The milling treatment was performed for 45 hours at the number of revolutions of 510 rpm by a planetary ball mill (from FRITSCH, model number: Premium line P-7). Thereby, a glassy compound A $(80 \, (0.80 \, (0.70Li_2S \cdot 0.30P_2S_5) \cdot 0.20Li_{3/2}Al_{1/2}N) \cdot 12LiBr \cdot 8LiI)$ was obtained.

Separately, in a glove box in an argon atmosphere with a dew point of −50° C. or lower, $Li_2S$ (99.98%, Aldrich) and $SnS_2$ (99.9%, Kojundo Chemical Lab. Co., Ltd.) were weighed so as to have a molar ratio of 2:1, and then mixed in a mortar. The mixed sample was charged into a closed 80 mL zirconia pot containing 160 g of zirconia balls with a diameter of 4 mm. The milling treatment was performed for 40 hours at the number of revolutions of 510 rpm by a planetary ball mill (from FRITSCH, model number: Premium line P-7). Thereby, a glassy compound B $(Li_{4/3}Sn_{1/3}S_{4/3})$ was obtained.

Next, in a glove box in an argon atmosphere having a dew point of −50° C. or lower, the obtained glassy compound A and glassy compound B were weighed so as to have a molar ratio of 90:10 based on the composition formula $0.80 \, (0.80 \, (0.70Li_2S \cdot 0.30P_2S_5) \cdot 0.20Li_{3/2}Al_{1/2}N) \cdot 0.12LiBr \cdot 0.08LiI$ and the composition formula $Li_{4/3}Sn_{1/3}S_{4/3}$, and then mixed in a mortar. The mixed sample was charged into a closed 80 mL zirconia pot containing 160 g of zirconia balls with a diameter of 4 mm. The milling treatment was performed for 2 hours at the number of revolutions of 230 rpm by a planetary ball mill (from FRITSCH, model number: Premium line P-7). Thereafter, the resulted sample was heat-treated at 250° C. for 2 hours to obtain a sulfide solid electrolyte of Example 1. The heat treatment temperature was set to a temperature that was equal to or higher than the crystallization temperature and was not 100° C. or higher than the crystallization temperature. The crystallization temperature was determined by taking out a part of the sample after the milling treatment and subjecting the part to DSC measurement. The DSC measurement was performed under the following conditions. More specifically, the measurement was performed by raising the temperature from room temperature to 400° C. at 10° C./min using a DSC device (Thermo Plus DSC8230 from Rigaku Corporation) and a hermetically sealed pan made of SUS.

Examples 2 to 5, Comparative Example 1

Sulfide solid electrolytes of Examples 2 to 5 and Comparative Example 1 were obtained similarly to Example 1 except that the compositions of the sulfide solid electrolytes were as follows.

Example 2: $80 \, (0.80 \, (0.80 \, (0.70Li_2S_{0.30}P_2S_5) \cdot 0.20Li_{3/2}$—$Al_{1/2}N) \cdot 0.12LiBr \cdot 0.08LiI) \cdot 20Li_{4/3}Sn_{1/3}S_{4/3}$, Example 3: $70 \, (0.80 \, (0.80 \, (0.70Li_2S_{0.30}P_2S_5) \cdot 0.20Li_{3/2}$—$Al_{1/2}$—N)·$0.12LiBr \cdot 0.08LiI) \cdot 30Li_{4/3}Sn_{1/3}S_{4/3}$, Example 4: $60 \, (0.80 \, (0.80 \, (0.70Li_2S_{0.30}P_2S_5) \cdot 0.20Li_{3/2}$—$Al_{1/2}$—N)·$0.12LiBr \cdot 0.08LiI) \cdot 40Li_{4/3}Sn_{1/3}S_{4/3}$, Example 5: 50 (0.80 (0.80 (0.70Li$_2$S$_{0.30}$P$_2$S$_5$)·0.20Li$_{3/2}$—Al$_{1/2}$N)·0.12 LiBr. 0.08LiI)·50Li$_{4/3}$Sn$_{1/3}$S$_{4/3}$, Comparative Example 1: 100 (0.80 (0.80 (0.70Li$_2$S·0.30P$_2$S$_5$)·0.20Li$_{3/2}$Al$_{1/2}$N)·0.12LiBr·0.08LiI)

In Comparative Example 1, a glassy compound A 80(0.80 (0.70Li$_2$S·0.30P$_2$S$_5$)·0.20Li$_{3/2}$Al$_{1/2}$N)·12LiBr·8LiI obtained in the same procedure as in Example 1 was heat-treated alone at 250° C. for 2 hours to obtain a sulfide solid electrolyte of Comparative Example 1.

[Example 3'] (1-Step Synthesis)

A sulfide solid electrolyte represented by the composition formula: 70(0.80(0.80(0.70Li$_2$S$_{0.30}$P$_2$S$_5$)·0.20Li$_{3/2}$Al$_{1/2}$N) ·0.12LiBr·0.08LiI)·30Li$_{4/3}$Sn$_{1/3}$S$_{4/3}$ was synthesized by the following treatment.

In a glove box in an argon atmosphere having a dew point of −50° C. or lower, Li$_2$S (99.98%, Aldrich), P$_2$S$_5$ (99%, Aldrich), Li$_{3/2}$Al$_{1/2}$N, LiBr (99.999%, Aldrich), LiI (99.999%, Aldrich), and SnS$_2$ (99.9%, Kojundo Chemical Laboratory) were weighed so as to have a molar ratio of 51.4:13.4:11.2:8.4:5.6:10, and then mixed in a mortar. As Li$_{3/2}$Al$_{1/2}$N, one prepared in the same procedure as in Example 1 was used. The mixed sample was charged into a closed 80 mL zirconia pot containing 160 g of zirconia balls with a diameter of 4 mm. The milling treatment was performed for 45 hours at the number of revolutions of 510 rpm by a planetary ball mill (from FRITSCH, model number: Premium line P-7). Thereafter, the resulted sample was heat-treated at 250° C. for 2 hours to obtain a sulfide solid electrolyte of Example 3'.

Example 6

A sulfide solid electrolyte represented by the composition formula 90 (0.80 (0.75Li$_2$S·0.25P$_2$S$_5$)·0.12LiBr·0.08LiI) ·10Li$_{4/3}$Sn$_{1/3}$S$_{4/3}$ was synthesized by the following treatment.

In a glove box in an argon atmosphere having a dew point of −50° C. or lower, Li$_2$S (99.98%, Aldrich), P$_2$S$_5$ (99%, Aldrich), LiBr (99.999%, Aldrich), and LiI (99.999%, Aldrich) were weighed so as to have a molar ratio of 60:20:12:8, and then mixed in a mortar. The mixed sample was charged into a closed 80 mL zirconia pot containing 160 g of zirconia balls with a diameter of 4 mm. The milling treatment was performed for 45 hours at the number of revolutions of 510 rpm by a planetary ball mill (from FRITSCH, model number: Premium line P-7). Thereby, a glassy compound C (80 (0.75Li$_2$S·0.25P$_2$S$_5$)·12LiBr·8LiI) was obtained.

Separately, a glassy compound B (Li$_{4/3}$Sn$_{1/3}$S$_{4/3}$) was obtained similarly to Example 1.

Next, in a glove box in an argon atmosphere having a dew point of −50° C. or lower, the obtained glassy compound C and glassy compound B were weighed so as to have a molar ratio of 90:10 based on the composition formula 0.80 (0.75Li$_2$S·0.25P$_2$S$_5$)·0.12LiBr·0.08LiI and the composition formula Li$_{4/3}$Sn$_{1/3}$S$_{4/3}$, and then mixed in a mortar. The mixed sample was charged into a closed 80 mL zirconia pot containing 160 g of zirconia balls with a diameter of 4 mm. The milling treatment was performed for 2 hours at the number of revolutions of 230 rpm by a planetary ball mill (from FRITSCH, model number: Premium line P-7). Thereafter, the resulted sample was heat-treated at 190° C. for 2 hours to obtain a sulfide solid electrolyte of Example 6. The heat treatment temperature was set around the crystallization temperature (±50° C.). The crystallization temperature was determined by taking out a part of the sample after the milling treatment and subjecting the part to DSC measurement. The DSC measurement was performed under the same conditions as in Example 1.

Comparative Example 2

The glassy compound C (80 (0.75Li$_2$S·0.25P$_2$S$_5$) ·12LiBr·8LiI) obtained in Example 6 was heat-treated alone at 190° C. for 2 hours to obtain a sulfide solid electrolyte of Comparative Example 2.

[Evaluation]

(1) Powder X-Ray Diffraction Measurement

Powder X-ray diffraction measurement was performed for the solid electrolytes of Examples and Comparative Examples by the above method. As an airtight sample holder for X-ray diffraction measurement, trade name "general-purpose atmosphere separator" from Rigaku Corporation was used. Tables 4 and 6 show crystal structures identified from X-ray diffraction diagrams of the solid electrolytes of Examples and Comparative Examples. In Tables 4 and 6, the "HICP" represents a crystal phase having diffraction peaks in a range of 2θ=20.2°±0.5° and a range of 2θ=23.6°±0.5° in X-ray diffraction measurement using a CuKα ray. The "LSS" represents a crystal phase (Li$_{4/3}$Sn$_{1/3}$S$_{4/3}$) having a diffraction peak in a range of 2θ=25.6°±0.5° in X-ray diffraction measurement using a CuKα ray. The "ß-LPS" represents a crystal phase (ß-Li$_3$PS$_4$) having diffraction peaks in a range of 2θ=17.5°±0.5°, a range of 2θ=18.1°±0.5°, a range of 2θ=29.1°±0.5°, a range of 2θ=29.9°±0.5°, and a range of 31.2°±0.5° in X-ray diffraction measurement using a CuKα ray.

Figure 3:
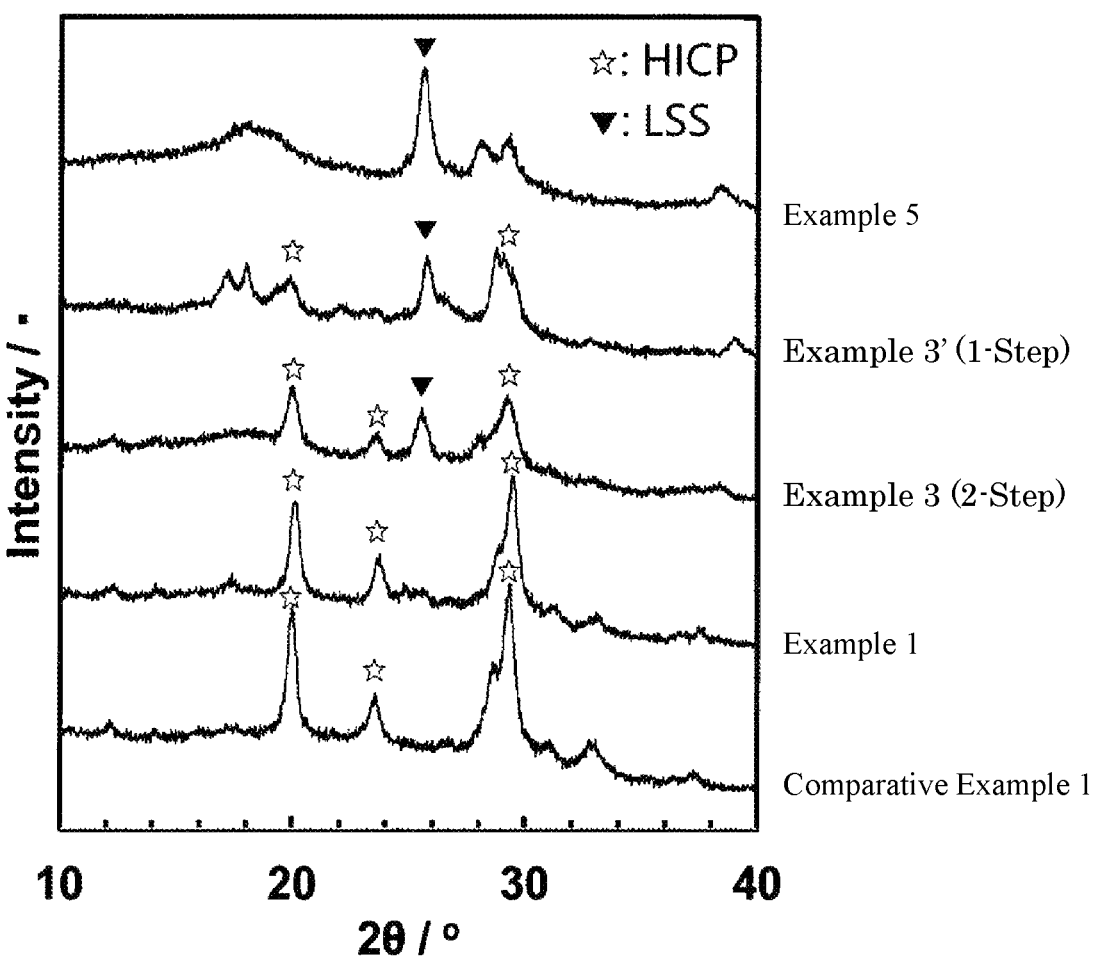
FIG. 3 is an X-ray diffraction diagram of solid electrolytes of Examples 1, 3, 3', and 5 and Comparative Example 1.

FIG. 3 shows an X-ray diffraction diagram of the solid electrolytes of Examples 1, 3, 3', and 5, and Comparative Example 1. It is found that the diffraction peak in the range of 2θ=25.6°±0.5° derived from LSS (Li$_{4/3}$Sn$_{1/3}$S$_{4/3}$) increases as the content ratio of tin increases. On the other hand, it is found that as the content ratio of tin increases, the diffraction peaks derived from HICP in the range of 2θ=20.2°±0.5° and the range of 2θ=23.6°±0.5° decrease.

(2) Ionic Conductivity

The ionic conductivity at −25° C. (σ$_{25}$) of the solid electrolytes of Examples and Comparative Examples was determined by measuring the alternating-current impedance by the above-described method using "VMP-300" from Bio-Logic Science Instruments. The measurement results are shown in Tables 4 and 6.

(3) Water Resistance Evaluation

For the solid electrolytes of Examples 1, 3, 3', 4, and 6 and Comparative Examples 1 and 2, water resistance was evaluated by the following procedure. For the solid electrolytes, the ionic conductivity at 25° C. (σ$_{25a}$) in (2) above was measured, and then the solid electrolytes were left standing in a dry air atmosphere having a dew point of −35° C. for 6 hours. Thereafter, the ionic conductivity at 25° C. (σ$_{25b}$) of the solid electrolytes was measured similarly to (2) above. Thereafter, the solid electrolytes were dried at 150° C. for 1 hour, and the ionic conductivity at 25° C. (σ$_{25c}$) of the dried solid electrolytes was measured similarly to (2) above. The measurement results are shown in Tables 5 and 7.

The ratio of the ionic conductivity after being left in a dry air atmosphere (σ$_{025b}$) to the initial ionic conductivity (before being left in the dry air atmosphere) (σ$_{25a}$) (retention rate: σ$_{25b}$/σ$_{25a}$) and the ratio of the ionic conductivity (σ$_{25c}$) after being left in the dry air atmosphere and further dried to the initial ionic conductivity (σ$_{25a}$) (recovery rate: σ$_{25c}$/σ$_{25a}$) are shown in Tables 5 and 7, respectively.

TABLE 4

| | Composition formula | Crystal structure | $\sigma_{25}$/mS cm$^{-1}$ |
|---|---|---|---|
| Comparative Example 1 | $100(0.80(0.70Li_2S\bullet0.30P_2S_5)\bullet0.20Li_{3/2}Al_{1/2}N)\bullet0.12LiBr\bullet0.08LiI)$ $(Li_{3.48}PAl_{0.21}S_{3.67}N0_{.42}Br_{0.31}I_{0.21})$ | HICP | 3.9 |
| Example 1 | $90(0.80(0.80(0.70Li_2S\bullet0.30P_2S_5)\bullet0.20Li_{3/2}Al_{1/2}N)\bullet0.12LiBr\bullet0.08LiI)\bullet10Li_{4/3}Sn_{1/3}S_{4/3}$ $(Li_{3.87}PSn_{0.10}Al_{0.21}S_{4.05}N_{0.42}Br_{0.31}I_{0.21})$ | HICP + LSS | 3.3 |
| Example 2 | $80(0.80(0.80(0.70Li_2S\bullet0.30P2S_5)\bullet0.20Li_{3/2}Al_{1/2}N)\bullet0.12LiBr\bullet0.08LiI)\bullet20Li_{4/3}Sn_{1/3}S_{4/3}$ $(\,Li_{4.35}PSn_{0.22}Al_{0.21}S_{4.53}N_{0.42}Br_{0.31}I_{0.21})$ | HICP + LSS | 1.8 |
| Example 3 | $70(0.80(0.80(0.70Li_2S\bullet0.30P_2S_5)\bullet0.20Li_{3/2}Al_{1/2}N)\bullet0.12LiBr\bullet0.08LiI)\bullet30Li_{4/3}Sn_{1/3}S_{4/3}$ $(Li_{4.97}PSn_{0.37}Al_{0.21}S_{5.15}N_{0.42}Br_{0.31}I_{0.21})$ | HICP + LSS | 1.5 |
| Example 3' (1-Step synthesis) | $70(0.80(0.80(0.70Li_2S\bullet0.30P_2S_5)\bullet0.20Li_{3/2}Al_{1/2}N)\bullet0.12LiBr\bullet0.08LiI)\bullet30Li_{4/3}Sn_{1/3}S_{4/3}$ $(Li_{4.97}PSn_{0.37}Al_{0.21}S_{5.15}N_{0.42}Br_{0.31}I_{0.21})$ | LSS + $\beta$ – LPS | 1.1 |
| Example 4 | $60(0.80(0.80(0.70Li_2S\bullet0.30P_2S_5)\bullet0.20Li_{3/2}Al_{1/2}N)\bullet0.12LiBr\bullet0.08LiI)\bullet40Li_{4/3}Sn_{1/3}S_{4/3}$ $(Li_{5.80}PSn_{0.58}Al_{0.21}S_{5.98}N_{0.42}Br_{0.31}I_{0.21})$ | HICP + LSS | 0.99 |
| Example 5 | $50(0.80(0.80(0.70Li_2S\bullet0.30P_2S_5)\bullet0.20Li_{3/2}Al_{1/2}N)\bullet0.12LiBr\bullet0.08LiI)\bullet50Li_{4/3}Sn_{1/3}S_{4/3}$ $(Li_{6.95}PSn_{0.87}Al_{0.21}S_{7.14}N_{0.42}Br_{0.31}I_{0.21})$ | LSS | 0.29 |

TABLE 5

| | Composition formula | $\sigma_{25a}$/mS cm$^{-1}$ |
|---|---|---|
| Comparative Example 1 | $100(0.80(0.70Li_2S\bullet0.30P_2S_5)\bullet0.20Li_{3/2}Al_{1/2}N)\bullet0.12LiBr\bullet0.08LiI)$ $(Li_{3.48}PAl_{0.21}S_{3.67}N_{0.42}Br_{0.31}I_{0.21})$ | 3.9 |
| Example 1 | $90(0.80(0.70Li_2S\bullet0.30P_2S_5)\bullet0.20Li_{3/2}Al_{1/2}N)\bullet0.12LiBr\bullet0.08LiI)\bullet10Li_{4/3}Sn_{1/3}S_{4/3}$ $(Li_{3.87}PSn_{0.10}Al_{0.21}S_{4.05}N_{0.42}Br_{0.31}I_{0.21})$ | 3.3 |
| Example 3 | $70(0.80(0.80(0.70Li_2S\bullet0.30P_2S_5)\bullet0.20Li_{3/2}Al_{1/2}N)\bullet0.12LiBr\bullet0.08LiI)\bullet30Li_{4/3}Sn_{1/3}S_{4/3}$ $(Li_{4.97}PSn_{0.37}Al_{0.21}S_{5.15}N_{0.42}Br_{0.31}I_{0.21})$ | 1.5 |
| Example 3' (1-Step synthesis) | $70(0.80(0.80(0.70Li_2S\bullet0.30P_2S_5)\bullet0.20Li_{3/2}Al_{1/2}N)\bullet0.12LiBr\bullet0.08LiI)\bullet30Li_{4/3}Sn_{1/3}S_{4/3}$ $(Li_{4.97}PSn_{0.37}Al_{0.21}S_{5.15}N_{0.42}Br_{0.31}I_{0.21})$ | 1.1 |
| Example 4 | $60(0.80(0.80(0.70Li_2S\bullet0.30P_2S_5)\bullet0.20Li_{3/2}Al_{1/2}N)\bullet0.12LiBr\bullet0.08LiI)\bullet40Li_{4/3}Sn_{1/3}S_{4/3}$ $(Li_{5.80}PSn_{0.58}Al_{0.21}S_{5.98}N_{0.42}Br_{0.31}I_{0.21})$ | 0.99 |

| | $\sigma_{25b}$/mS cm$^{-1}$ | $\sigma_{25c}$/mS cm$^{-1}$ | $\sigma_{25b}/\sigma_{25a}$/% | $\sigma_{25c}/\sigma_{25a}$/% |
|---|---|---|---|---|
| Comparative Example 1 | 1.5 | 2.9 | 38 | 74 |
| Example 1 | 2.4 | 2.9 | 73 | 88 |
| Example 3 | 0.86 | 1.3 | 57 | 87 |
| Example 3' (1-Step synthesis) | 0.79 | 0.94 | 72 | 85 |
| Example 4 | 0.69 | 0.84 | 70 | 85 |

TABLE 6

| | Composition formula | Crystal structure | $\sigma_{25}$/mS cm$^{-1}$ |
|---|---|---|---|
| Comparative Example 2 | $100(0.80(0.75Li_2S\bullet0.25P_2S_5)\bullet0.12LiBr\bullet0.08LiI)$ $(Li_{3.50}PS_{4.00}Br_{0.30}I_{0.20})$ | HICP | 5.4 |
| Example 6 | $90(0.80(0.75Li_2S\bullet0.25P_2S_5)\bullet0.12LiBr\bullet0.08LiI)\bullet10Li_{4/3}Sn_{1/3}S_{4/3}$ $(Li_{3.87}PSn_{0.09}S_{4.37}Br_{0.30}I_{0.20})$ | HICP + LSS | 4.0 |

TABLE 7

| | Composition formula | $\sigma_{25a}$/mS cm$^{-1}$ |
|---|---|---|
| Comparative Example 2 | $100(0.80(0.75Li_2S\bullet0.25P_2S_5)\bullet0.12LiBr\bullet0.08LiI)$ $(Li_{3.50}PS_{4.00}Br_{0.30}I_{0.20})$ | 5.4 |
| Example 6 | $90(0.80(0.75Li_2S\bullet0.25P_2S_5)\bullet0.12LiBr\bullet0.08LiI)\bullet10Li_{4/3}Sn_{1/3}S_{4/3}$ $(Li_{3.87}PSn_{0.09}S_{4.37}Br_{0.30}I_{0.20})$ | 4.0 |

TABLE 7-continued

| | $\sigma_{25b}$/mS cm$^{-1}$ | $\sigma_{25c}$/mS cm$^{-1}$ | $\sigma_{25b}/\sigma_{25a}$/% | $\sigma_{25c}/\sigma_{25a}$/% |
|---|---|---|---|---|
| Comparative Example 2 | 3.9 | 4.4 | 73 | 82 |
| Example 6 | 3.1 | 3.7 | 76 | 92 |

As shown in Tables 5 and 7, the solid electrolytes of Examples have a high recovery rate ($\sigma_{25c}/\sigma_{25a}$) of ionic conductivity after being left in a dry air atmosphere and further dried. It is considered that since the solid electrolytes of Examples contain tin as a constituent element, water resistance is high, and the reaction with water when brought into contact with moisture in the atmosphere is suppressed. In addition, the solid electrolytes of Examples also have a high retention rate ($\sigma_{25b}/\sigma_{25a}$) of ionic conductivity after being left in a dry air atmosphere, and thus it can be said that the water resistance is high.

As shown in Tables 4 and 5, it is found that the ionic conductivity is enhanced by setting the content ratio of tin to a relatively small amount, and the water resistance and the ionic conductivity can be optimized in a well-balanced manner by adjusting the content ratio of tin.

In addition, comparing Example 3 and Example 3' which are solid electrolytes having the same composition, the solid electrolyte of Example 3 obtained by synthesizing glassy $Li_{4/3}Sn_{1/3}S_{4/3}$ in advance and then mixing with another raw material compound was slightly more excellent in ionic conductivity and water resistance than the solid electrolyte of Example 3' obtained by synthesizing glassy $Li_{4/3}Sn_{1/3}S_{4/3}$ and mixing with another raw material compound at once. However, it is found that a solid electrolyte having sufficient ionic conductivity and water resistance can be obtained by both synthesis methods.

INDUSTRIAL APPLICABILITY

The solid electrolyte according to the present invention is suitably used as a solid electrolyte of an energy storage device such as an all-solid-state battery.

DESCRIPTION OF REFERENCE SIGNS

1: positive electrode layer
2: negative electrode layer
3: isolation layer
4: positive electrode substrate
5: positive active material layer
6: negative active material layer
7: negative electrode substrate
10: energy storage device (all-solid-state battery)
20: energy storage unit
30: energy storage apparatus

The invention claimed is:

1. A solid electrolyte having a crystal structure, comprising:
   lithium, phosphorus, sulfur, halogen, and tin as constituent elements,
   wherein the crystal structure has a diffraction peak in a range of 20.2°±0.5° in an X-ray diffraction diagram using a CuKα ray, and a number of the diffraction peak in the range of 20.2°±0.5° is only one,
   wherein the solid electrolyte further comprises nitrogen and an element M as constituent elements, and
   wherein the element M is at least one selected from the group consisting of aluminum, tantalum, silicon, scandium, magnesium, niobium, boron, hafnium, carbon, zirconium, and titanium.

2. The solid electrolyte according to claim 1, wherein the crystal structure further has a diffraction peak in a range of 23.6°±0.5° in the X-ray diffraction diagram using the CuKα ray.

3. The solid electrolyte according to claim 1, wherein the crystal structure further has a diffraction peak in a range of 25.6°±0.5° in the X-ray diffraction diagram using the CuKα ray.

4. The solid electrolyte according to claim 1, wherein the molar ratio of the content of the tin to the content of the phosphorus is 0.05 or more and 1.0 or less.

5. The solid electrolyte according to claim 1, comprising at least one selected from the group consisting of bromine and iodine as the halogen.

6. The solid electrolyte according to claim 1,
   wherein the molar ratio of the content of the tin to the content of the phosphorus is 0.01 or more and 0.2 or less.

7. The solid electrolyte according to claim 6, comprising at least one selected from the group consisting of bromine and iodine as the halogen.

8. The solid electrolyte according to claim 1, wherein the molar ratio of the content of the tin to the content of the phosphorus is 0.05 or more and 0.2 or less.

9. An energy storage device comprising the solid electrolyte according to claim 1.

10. A method for producing a solid electrolyte having a crystal structure, comprising:
    preparing a composition containing lithium, phosphorus, sulfur, halogen, and tin;
    reacting the composition to obtain an intermediate; and
    heating the intermediate,
    wherein the crystal structure has a diffraction peak in a range of 20.2°±0.5° in an X-ray diffraction diagram using a CuKα ray, and a number of the diffraction peak in the range of 20.2°±0.5° is only one,
    wherein the composition further comprises nitrogen and an element M as constituent elements, and
    wherein the element M is at least one selected from the group consisting of aluminum, tantalum, silicon, scandium, magnesium, niobium, boron, hafnium, carbon, zirconium, and titanium.

11. The method for producing a solid electrolyte according to claim 10, wherein the composition contains a compound containing lithium, sulfur, and tin.

12. The method for producing a solid electrolyte according to claim 10, wherein the crystal structure further has a diffraction peak in a range of 23.6°±0.5° in the X-ray diffraction diagram using the CuKα ray.

13. The method for producing a solid electrolyte according to claim 10, wherein the crystal structure further has a diffraction peak in a range of 25.6°±0.5° in the X-ray diffraction diagram using the CuKα ray.

14. A solid electrolyte having a crystal structure, comprising:

lithium, phosphorus, sulfur, halogen, tin and nitrogen as constituent elements, wherein the molar ratio of the content of the nitrogen to the content of the phosphorus is 0.01 or more and 1.2 or less.

15. The solid electrolyte according to claim 14, wherein the crystal structure has diffraction peaks in a range of 20.2°±0.5° and a range of 23.6°±0.5° in an X-ray diffraction diagram using a CuKα ray.

16. The solid electrolyte according to claim 14, wherein the crystal structure has a diffraction peak in a range of 25.6°±0.5° in an X-ray diffraction diagram using a CuKα ray.

17. The solid electrolyte according to claim 14, wherein the molar ratio of the content of the tin to the content of the phosphorus is 0.05 or more and 1.0 or less.

18. The solid electrolyte according to claim 14, further comprising an element M as constituent elements, wherein the element M is at least one selected from the group consisting of aluminum, tantalum, silicon, scandium, magnesium, niobium, boron, hafnium, carbon, zirconium, and titanium.

19. The solid electrolyte according to claim 14, comprising at least one selected from the group consisting of bromine and iodine as the halogen.

20. An energy storage device comprising the solid electrolyte according to claim 14.

* * * * *